(12) United States Patent
Xu et al.

(10) Patent No.: US 9,779,106 B2
(45) Date of Patent: Oct. 3, 2017

(54) APPLICATION MANAGEMENT METHOD AND DEVICE

(75) Inventors: Wei Xu, Beijing (CN); Qiming Deng, Beijing (CN); Dong Chen, Beijing (CN); Sheng Wang, Beijing (CN); Shiguang Huang, Beijing (CN); Qing Liu, Beijing (CN); Yanxia Chen, Beijing (CN)

(73) Assignees: LENOVO (BEIJING) CO., LTD., Haidian District, Beijing (CN); BEIJING LENOVO SOFTWARE LTD., Haidian District, Beijing (CN)

(*) Notice: Subject to any disclaimer, the term of this patent is extended or adjusted under 35 U.S.C. 154(b) by 618 days.

(21) Appl. No.: 14/239,186

(22) PCT Filed: Aug. 14, 2012

(86) PCT No.: PCT/CN2012/001083
§ 371 (c)(1),
(2), (4) Date: May 30, 2014

(87) PCT Pub. No.: WO2013/023440
PCT Pub. Date: Feb. 21, 2013

(65) Prior Publication Data
US 2014/0351215 A1    Nov. 27, 2014

(30) Foreign Application Priority Data

Aug. 15, 2011 (CN) .......................... 2011 1 0233852
Sep. 5, 2011 (CN) .......................... 2011 1 0260774
(Continued)

(51) Int. Cl.
*G06F 17/30* (2006.01)
*G06F 9/44* (2006.01)
*G06F 9/445* (2006.01)

(52) U.S. Cl.
CPC .......... *G06F 17/30174* (2013.01); *G06F 8/61* (2013.01); *G06F 9/4445* (2013.01)

(58) Field of Classification Search
USPC ........ 707/634, 635, 640; 709/202, 107, 100, 709/224; 715/738
See application file for complete search history.

(56) References Cited

U.S. PATENT DOCUMENTS 6,044,394 A * 3/2000 Cadden ............... G06F 9/45512
718/100
7,409,569 B2   8/2008 Illowsky
(Continued)

FOREIGN PATENT DOCUMENTS

CN   1722128 A   1/2006
CN   1945535 A   4/2007
(Continued)

OTHER PUBLICATIONS

Third Office Action dated Nov. 2, 2015 out of Chinese priority Application No. 201110260774.4 (32 pages).
(Continued)

*Primary Examiner* — Hung T Vy
(74) *Attorney, Agent, or Firm* — Brinks Gilson & Lione; G. Peter Nichols

(57) ABSTRACT

Disclosed are an application management method and device, applied to a first device connected to a second device. The method includes mapping at least one application in the second device, to obtain at least one corresponding application identifier; detecting a first operation; when the first operation satisfies a first preset condition, determining an application identifier of a first application according to the at least one application identifier; detecting a second operation; when the second operation satisfies a second preset condition, obtaining a corresponding application management command according to the second operation;
(Continued)

and sending the application management command to the second device, so that the second device manages the first application according to the application management command.

44 Claims, 17 Drawing Sheets

(30) Foreign Application Priority Data

| | | |
|---|---|---|
| Oct. 17, 2011 | (CN) | 2011 1 0314486 |
| Oct. 31, 2011 | (CN) | 2011 1 0337685 |
| Oct. 31, 2011 | (CN) | 2011 1 0338645 |

(56) References Cited

U.S. PATENT DOCUMENTS

| | | | |
|---|---|---|---|
| 7,454,542 B2 | 11/2008 | Illowsky | |
| 7,571,346 B2 | 8/2009 | Illowsky | |
| 7,596,227 B2 | 9/2009 | Illowsky | |
| 7,600,252 B2 | 10/2009 | Illowsky | |
| 7,613,881 B2 | 11/2009 | Illowsky | |
| 7,703,073 B2 | 4/2010 | Illowsky | |
| 7,712,111 B2 | 5/2010 | Illowsky | |
| 7,730,482 B2 | 6/2010 | Illowsky | |
| 7,747,980 B2 | 6/2010 | Illowsky | |
| 7,761,863 B2 | 7/2010 | Illowsky | |
| 7,788,663 B2 | 8/2010 | Illowsky | |
| 7,831,752 B2 | 11/2010 | Illowsky | |
| 7,865,571 B2 | 1/2011 | Ho | |
| 8,082,321 B2 | 12/2011 | Ho | |
| 8,352,550 B2 | 1/2013 | Boudreau | |
| 8,594,630 B2 | 11/2013 | Ho | |
| 8,645,948 B2 * | 2/2014 | Kelley | G06F 8/61 709/202 |
| 9,137,280 B2 | 9/2015 | Boudreau | |
| 2002/0026507 A1 * | 2/2002 | Sears | H04L 41/22 709/224 |
| 2003/0221024 A1 | 11/2003 | Arroyo et al. | |
| 2004/0024890 A1 | 2/2004 | Baek | |
| 2005/0240921 A1 | 10/2005 | Barket et al. | |
| 2005/0289264 A1 | 12/2005 | Illowsky | |
| 2005/0289265 A1 | 12/2005 | Illowsky | |
| 2005/0289266 A1 | 12/2005 | Illowsky | |
| 2005/0289383 A1 | 12/2005 | Illowsky | |
| 2005/0289508 A1 | 12/2005 | Illowsky | |
| 2005/0289509 A1 | 12/2005 | Illowsky | |
| 2005/0289510 A1 | 12/2005 | Illowsky | |
| 2005/0289527 A1 | 12/2005 | Illowsky | |
| 2005/0289531 A1 | 12/2005 | Illowsky | |
| 2005/0289558 A1 | 12/2005 | Illowsky | |
| 2005/0289559 A1 | 12/2005 | Illowsky | |
| 2006/0005193 A1 | 1/2006 | Illowsky | |
| 2006/0005205 A1 | 1/2006 | Illowsky | |
| 2006/0010453 A1 | 1/2006 | Illowsky | |
| 2006/0015665 A1 | 1/2006 | Illowsky | |
| 2006/0015936 A1 | 1/2006 | Illowsky | |
| 2006/0015937 A1 | 1/2006 | Illowsky | |
| 2006/0020912 A1 | 1/2006 | Illowsky | |
| 2006/0026305 A1 | 2/2006 | Illowsky | |
| 2006/0026588 A1 | 2/2006 | Illowsky | |
| 2006/0206882 A1 | 9/2006 | Illowsky | |
| 2006/0240806 A1 * | 10/2006 | Demirbasa | G08B 13/1427 455/412.1 |
| 2008/0098391 A1 | 4/2008 | Medvedev et al. | |
| 2008/0134049 A1 * | 6/2008 | Gupta | G06F 9/4843 715/738 |
| 2008/0165906 A1 | 7/2008 | Ho | |
| 2009/0030995 A1 | 1/2009 | Boudreau | |
| 2009/0113088 A1 | 4/2009 | Illowsky | |
| 2010/0106804 A1 | 4/2010 | He | |
| 2010/0262953 A1 * | 10/2010 | Barboni | G06F 8/61 717/120 |
| 2010/0328717 A1 | 12/2010 | Sugasaki | |
| 2011/0099246 A1 | 4/2011 | Ho | |
| 2011/0202583 A1 | 8/2011 | Provencher | |
| 2011/0219047 A1 | 9/2011 | Dewa | |
| 2011/0247013 A1 * | 10/2011 | Feller | G06F 21/44 709/219 |
| 2012/0089702 A1 | 4/2012 | Ho | |
| 2012/0137282 A1 | 5/2012 | Illowsky | |
| 2012/0157165 A1 * | 6/2012 | Kim | G06F 21/6218 455/566 |
| 2012/0309464 A1 * | 12/2012 | Lim | H04M 1/72522 455/566 |
| 2013/0097281 A1 | 4/2013 | Boudreau | |

FOREIGN PATENT DOCUMENTS

| | | |
|---|---|---|
| CN | 101031882 | 9/2007 |
| CN | 101148772 | 3/2008 |
| CN | 101150809 A | 3/2008 |
| CN | 101448214 | 6/2009 |
| CN | 101655798 | 2/2010 |
| CN | 101656789 A | 2/2010 |
| CN | 101681332 | 3/2010 |
| CN | 101727449 | 6/2010 |
| CN | 101853184 A | 10/2010 |
| CN | 101860591 | 10/2010 |
| CN | 101860591 A | 10/2010 |
| CN | 101938585 | 1/2011 |
| CN | 102033591 A | 4/2011 |
| CN | 102033951 | 4/2011 |
| CN | 102087577 A | 6/2011 |
| CN | 102110031 A | 6/2011 |
| CN | 102197386 | 9/2011 |
| JP | 2000259437 A | 9/2000 |
| WO | WO 2010/052979 | 5/2010 |
| WO | WO 2010/052979 A1 | 5/2010 |

OTHER PUBLICATIONS

Fourth Office Action dated Mar. 30, 2016 out of Chinese priority Application No. 201110260774.4 (31 pages).
Third Office Action dated Mar. 28, 2016 out of Chinese priority Application No. 201110314486.2 (6 pages).
Chinese First Office Action with English Translation for related Application No. 201110314486.2 dated May 4, 2015, 26 pages.
Chinese First Office Action with English Translation for related Application No. 201110337685.5 dated May 6, 2015, 12 pages.
Chinese Second Office Action with English Translation for related Application No. 201110233852.1 dated Jul. 6, 2015, 9 pages.
Chinese Second Office Action with English Translation for related Application No. 201110260774.4 dated Jun. 2, 2015, 19 pages.
PCT/CN2012/001083 International Preliminary Report on Patentability (11 pages including English translation).
Chinese Second Office Action with English Translation for related Application No. 201110338645.2 dated Jul. 24, 2015 (22 pages).
PCT/CN2012/001083 International Search Report dated Nov. 22, 2012 (4 pages including English translation).
PCT/CN2012/001083 Written Opinion of the International Searching Authority dated Nov. 22, 2012 (5 pages including English translation).
Third Office Action dated Jan. 20, 2016 out of Chinese priority Application No. 201110338645.2 (21 pages).
Office Action, and English language translation thereof, in corresponding Chinese Application No. 201110314486.2, dated Sep. 29, 2016, 35 pages.
Blackpisces, "91 Phone assistant For iPhone Detailed Tutorial", Baidu Library, dated Mar. 15, 2011, obtained from the Internet at: http://wenku.baidu.com/view//77e10e620b1c59eef8c7b4cb. html?re=view, with an English machine translation, 18 pages.
Blackpisces, "Detailed User Guide for 91 PC Suite for iPhone", Baidu Library, dated Mar. 15, 2011 , obtained from the Internet at: http://wenku.baidu.com/view//77e10e620b1c59eef8c7b4cb. html?re=view, with an English machine translation, 91 pages.
International Preliminary Report on Patentability dated Feb. 18, 2014 from corresponding International Application No. PCTCN2012/001083 (6 pages).

(56) References Cited

OTHER PUBLICATIONS

First Office Action dated Apr. 11, 2014 from corresponding Chinese Application No. CN 201110233852.1 (12 pages including English translation).
First Office Action dated Oct. 10, 2014 from corresponding Chinese Application No. CN 201110260774.4 (20 pages including English translation).
First Office Action dated Dec. 5, 2014 from corresponding Chinese Application No. CN 201110338645.2 (20 pages including English translation).

* cited by examiner

APPLICATION MANAGEMENT METHOD
AND DEVICE

This application claims priority to International Application No. PCT/CN2012/001083 filed Aug. 14, 2012; Chinese Patent Application No.: 201110233852.1 filed Aug. 15, 2011; Chinese Patent Application No.: 201110260774.4 filed Sep. 5, 2011; Chinese Patent Application No.: 201110314486.2 filed Oct. 17, 2011; Chinese Patent Application No.: 201110338645.2 filed Oct. 31, 2011; and Chinese Patent Application No.: 201110337685.5 filed Oct. 31, 2011; the entire contents of each are incorporated herein by reference.

BACKGROUND

The present disclosure relates to the field of communications, and more particularly to an application management method and apparatus. Further, the present disclosure also relates to the field of electronic apparatus, and more particularly to a synchronization method and an electronic apparatus. Further, the present disclosure also relates to an association method, an electronic apparatus, and a hybrid system. Further, the present disclosure also relates to an application backup method, an electronic apparatus and a system.

A Hybrid architecture system refers to two or more systems that are combined together, for example, on the basis of one existing system, at least one other system is embedded (including another PC system or embedded system etc.), so that different systems work confluently, share information and devices, and play their respective advantages.

During the process of studying the prior art, the inventor found that, since the hybrid architecture system architecture has respective independent operating systems, it is impossible for any one operating system to invoke and manage applications in another operating system, which therefore affects user experience of a user using a portable terminal with a hybrid system.

In addition, in recent years, various electronic devices capable of recording data have been presented, a user may use different types of electronic devices to record the same type of data. For example, the user might use a mobile phone's phonebook to record part of phone numbers, and meanwhile use a computer to record the other part of phone numbers. Therefore, it is very necessary to synchronize various data recorded on various electronic devices.

In the synchronization method of the prior art, there are only two devices connected through a data line so as to synchronize specific data and thereby maintain consistency of the specific data between the two. However, such synchronization method is too simple and cannot meet varied complex needs of the current user.

In addition, in recent years, various electronic devices capable of recording and reproducing contents have been presented, a user may use different electronic devices to record and reproduce the same type of contents. For example, the user might use a PAD to record and reproduce a movie, and meanwhile use a desktop computer to record and reproduce the same movie. However, power consumption and performance of the PAD and the desktop computer are clearly different, therefore, the user may want to choose a different electronic device to record and reproduce contents according to needs of a different occasion.

In the method of the prior art, there is only the manner that two devices connected through a data line, then, an application on another electronic device is manually run from one electronic device, and thereafter contents on the another electronic device is opened through the application. However, such manner is inconvenient, and brings poor experience to a user.

In addition, with the continuous development of software technology, there are more and more diversified client software applied to computers, mobile phones and other electronic devices. When a user needs to back up certain applications of a certain client software, first the client software, e.g., Android, may be installed in an electronic device, then applications in the software and needing to be backed up are searched, and then these applications are backed up to the electronic device locally.

The above method of implementing application backup by installing the client software not only has cumbersome operating process, but also is inefficient.

SUMMARY

Embodiments of the present disclosure provide an application management method and apparatus to solve the problem that it is hard for the portable terminal with the conventional hybrid system to invoke a slave system application under control of a primary system, which causes a decrease of user experience.

To solve the above technical problem, embodiments of the present disclosure disclose the following technical solutions:

An application management method applied to a first apparatus connected with a second apparatus, the method comprising: mapping at least one application in the second apparatus, obtaining at least one corresponding application identifier; detecting a first operation; when the first operation satisfies a first preset condition, determining an application identifier for the first application from the at least one application identifier; detecting a second operation; when the second operation satisfies a second preset condition, obtaining a corresponding application manage command according to the second operation, and transmitting the application manage command to the second apparatus, so that the second apparatus manages the first application according to the application manage command.

An application management apparatus, which, as a first apparatus, connects with a second apparatus, the first apparatus comprising: a mapping unit for mapping at least one application in the second apparatus, obtaining at least one corresponding application identifier; a first detecting unit for detecting a first operation; a determining unit for, when the first operation satisfies a first preset condition, determining an application identifier for the first application from the at least one application identifier; a second detecting unit for detecting a second operation; a managing unit for, when the second operation satisfies a second preset condition, obtaining a corresponding application manage command according to the second operation, and transmitting the application manage command to the second apparatus, so that the second apparatus manages the first application according to the application manage command.

As can be seen from the above embodiments, in the embodiments of the present disclosure, the first apparatus connects with the second apparatus, maps at least one application in the second apparatus to obtain at least one corresponding application identifier, detects a first operation, determines the application identifier for the first application from the at least one application identifiers when the first operation satisfies a first preset condition, detects a second operation, obtains a corresponding application manage command according to the second operation when the second operation satisfies a second preset condition, and transmits the application manage command to the second apparatus, thus causing the second apparatus to manage the first application according to the application manage command. By applying the embodiments of the present disclosure, it is possible to achieve management on applications in the second apparatus through the first apparatus, and when the two apparatuses work jointly, when the applications in the second apparatus need to be used, the applications in the second apparatus can be managed in the first apparatus, without switching to a state where the second apparatus operates separately, which thereby achieves switching between applications of different apparatuses, and improves user experience of a user using a hybrid system portable terminal.

In addition, in the application management method according to another embodiment of the present disclosure, mapping at least one application in the second apparatus comprises: detecting data connection with the second electronic apparatus to obtain a detection result; when the detection result indicates that the data connection of the first electronic apparatus with the second electronic apparatus succeeds, obtaining a list of applications from the second electronic apparatus, the list of applications including at least one application installed in the second electronic apparatus; and creating at least one application identifier corresponding to one application in the list of applications according to the list of applications, wherein after the application identifier is triggered, the application corresponding to the application identifier can be started in the second electronic apparatus.

The electronic apparatus according to another embodiment of the present disclosure may further comprise: a connection detecting unit configured for detecting data connection with the second electronic apparatus to obtain a detection result; the mapping unit includes the following units: an obtaining unit configured for, when the detection result indicates that the data connection of the first electronic apparatus with the second electronic apparatus succeeds, obtaining a list of applications from the second electronic apparatus, the list of applications including at least one application installed in the second electronic apparatus; and a creating unit configured for, creating at least one application identifier corresponding to one application in the list of applications according to the list of applications, wherein after the application identifier is triggered, the application corresponding to the application identifier can be started in the second electronic apparatus.

By means of the method and the electronic apparatus according to this embodiment, it is convenient to obtain a list of applications installed in another electronic apparatus, create application identifiers corresponding to these applications, thus conveniently starting applications installed in the another electronic apparatus.

The application management method according to another embodiment of the present disclosure further comprises: associating, by the first electronic apparatus, applications in the list of applications with files of corresponding file types in the first storage unit and/or the second storage unit according to the list of applications.

The application management method according to another embodiment of the present disclosure further comprises: when activating files stored in the first and second storage units, displaying a graphical user interface including identifiers corresponding to applications capable of activating the files, wherein the applications capable of activating the files include applications locally installed in the first electronic apparatus and applications installed in the second electronic apparatus.

The electronic apparatus according to another embodiment of the present disclosure, wherein the second electronic apparatus includes a second storage unit, the electronic apparatus further comprising: a first storage unit configured for storing various users and files; an associating unit configured for associating applications in the list of applications with files of corresponding file types in the first storage unit and/or the second storage unit according to the list of applications.

The electronic apparatus according to another embodiment of the present disclosure further comprises: a display unit configured for, when activating files stored in the first and second storage units, displaying a graphical user interface including identifiers corresponding to applications capable of activating the files, wherein the applications capable of activating the files include applications locally installed in the first electronic apparatus and applications installed in the second electronic apparatus.

According to another embodiment of the present disclosure, there is provided a hybrid system comprising a first apparatus that includes a first hardware system having a first operating system and a second electronic apparatus that includes a second hardware system having a second operation system, wherein the second electronic apparatus includes: a second storage unit configured for storing various user and files, the first electronic apparatus includes: a first storage unit configured for storing various user and files; a detecting unit configured for obtaining a detection result; an obtaining unit configured for, when the detection result satisfies a preset condition, obtaining a list of applications from the second electronic apparatus, the list of applications including at least one application installed in the second electronic apparatus; and an associating unit configured for associating applications in the list of applications with files of corresponding file types in the first storage unit and/or the second storage unit according to the list of applications.

By adopting the method, the electronic apparatus, and the hybrid system according to this embodiment, applications and files on different apparatuses can be associated, thus files can be opened conveniently.

Further, the application management method according to another embodiment of the present disclosure further comprises: receiving, by the second electronic apparatus, a backup request transmitted by the first electronic apparatus via the communication port, the backup request including information on applications of the second client software that are requested to be backed up; searching, by the second electronic apparatus, the applications of the second client software that are requested to be backed up; transmitting, by the second electronic apparatus, to the first electronic apparatus searched-out applications of the second client software via the communication port, causing the first electronic apparatus to make a backup.

Further, the electronic apparatus according to another embodiment of the present disclosure further comprises: a request receiving unit for receiving a backup request transmitted by the another/first electronic apparatus via the communication port, the backup request including information on applications of client software in the electronic apparatus that are requested to be backed up; an application searching unit for searching the applications of client software in the electronic apparatus that are requested to be backed up; an application transmitting unit for transmitting to the another/first electronic apparatus searched-out applications via the communication port, causing the another/first electronic apparatus to make a backup.

In addition, according to another embodiment of the present disclosure, there is provided an application backup system, comprising: a first electronic apparatus installed with first client software and a second electronic apparatus installed with second client software, the first electronic apparatus and the second electronic apparatus are connected via a communication port, the second electronic apparatus is for receiving a backup request transmitted by the first electronic apparatus via the communication port, the backup request including information on applications of the second client software that are requested to be backed up; searching the applications of the second client software that are requested to be backed up; transmitting to the first electronic apparatus searched-out applications of the second client software via the communication port, causing the first electronic apparatus to make a backup.

By means of the method and the corresponding electronic apparatus and system in this embodiment, when two electronic apparatuses communicate through a communication port, backup of applications between different client software can be completed directly, without the need to install the entire client software, which quickly realizes application backup, simplifies operating process, and improves backup efficiency.

Further, according to another embodiment of the present disclosure, the second electronic device has a display screen, the application management method may further comprise: wherein the second electronic apparatus has a display screen, the method further comprises: when detecting that the first electronic apparatus is connected with the second electronic apparatus, transmitting to the first electronic apparatus a first message indicating the connection; after receiving the first message, setting, by the first electronic apparatus, attribute of a pre-installed application to be installable in a system interface with respect to the first electronic apparatus; after receiving from the user a first operation command of installing the application, transmitting, by the first electronic apparatus, to the second electronic apparatus the application and a second command indicating installation of the application; after receiving the second command and the application, installing the application and transmitting to the first electronic apparatus a second message including information for generating an identifier of the application, by second electronic apparatus; after receiving the second message, generating an identifier of the application on the display screen of the second electronic apparatus, and setting attribute of the identifier of the application to be executable and uninstallable, by the first electronic apparatus.

Further, the electronic apparatus according to another embodiment of the present disclosure further comprises: an embedded controller for, when detecting a connection with the another/second electronic apparatus, generating a first message indicating the connection and transmitting to the another/first electronic apparatus the first message indicating the connection; a controller configured for, after receiving the first message, setting attribute of a pre-installed application to be installable in a system interface with respect to the first electronic apparatus; after receiving from the user a first operation command of installing the application, transmitting to the another/second electronic apparatus the application and a second command indicating installation of the application; after receiving the second message, generating on the display screen of the another/second electronic apparatus an identifier of the application, and setting attribute of the identifier of the application to be executable and uninstallable.

Further, the electronic apparatus according to another embodiment of the present disclosure further comprises: a controller for receiving from an embedded controller of the another electronic apparatus a first message indicating a connection with the another electronic apparatus; receiving from the another electronic apparatus an application and a second command indicating installment of the application, wherein attribute of the application is set installable in a system interface with respect to the another/first electronic apparatus; after receiving the second command and the application, installing the application and transmitting to the another/first electronic apparatus a second message including information for generating an identifier of the application; wherein after receiving the second message, the another first electronic apparatus generates on the display screen of the second electronic apparatus an identifier of the application, and sets attribute of the identifier of the application to be executable and uninstallable.

By means of the operation method and the electronic apparatus according to this embodiment of the present disclosure, installment, running, and uninstallment of an application that needs to be installed in the second electronic apparatus can be completed directly on a system interface of the operating system of the first electronic apparatus, thereby user convenience is improved.

BRIEF DESCRIPTION OF THE DRAWINGS

In order to more clearly illustrate the technical solutions in the embodiments of the present disclosure or in the prior art, drawings necessary for describing the embodiments or the prior art will be briefly introduced below, obviously, for those of ordinary skill in the art, it is possible to attain other drawings based on these drawings without paying creative effort.

DETAILED DESCRIPTION

The following embodiments of the present disclosure provide an application management method and apparatus. These embodiments are applied to a first apparatus connected with a second apparatus.

The technical solutions in the embodiments of the present disclosure will be further described in detail in conjunction with the accompanying drawings, to enable those skilled in the art to better understand the technical solutions in the embodiments of the present disclosure, and to make the above-described objects, features, and advantages be more apparent and pellucid.

Figure 1:
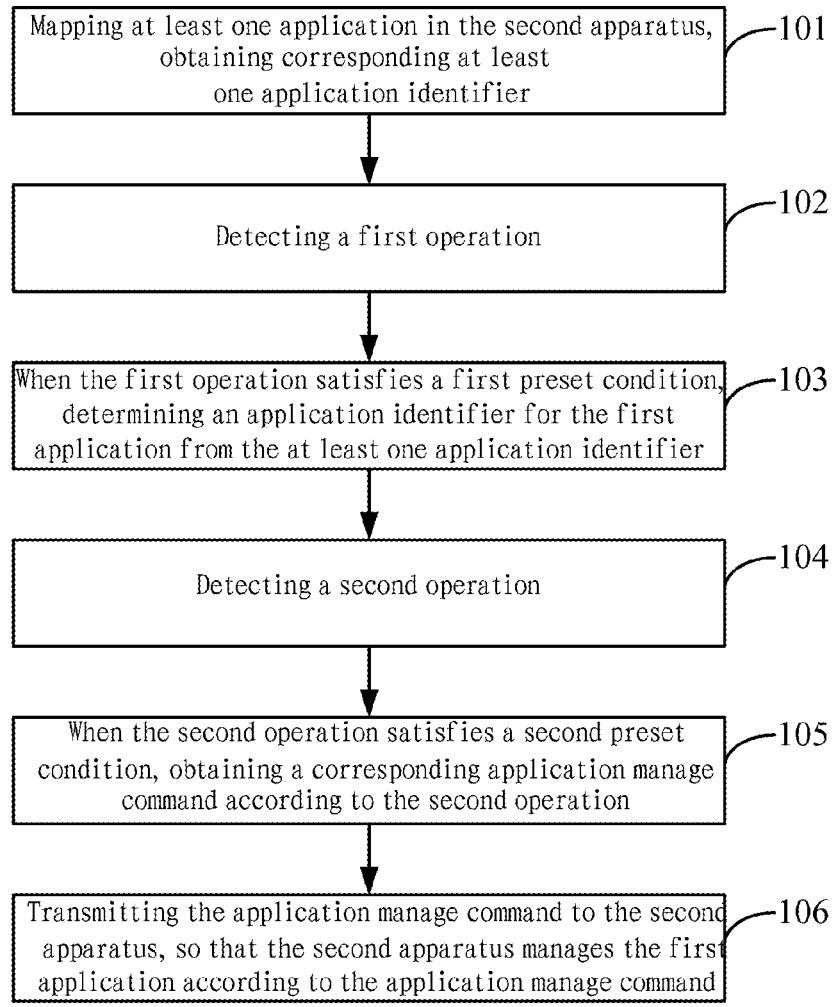
FIG. 1 is a flowchart of a first embodiment of the application management in the present disclosure.

Referring to FIG. 1, FIG. 1 is a flowchart of a first embodiment of the application management in the present disclosure:

Step 101: Mapping at least one application in the second apparatus, obtaining at least one corresponding application identifier.

Specifically, the first apparatus transmits to the second apparatus a request for obtaining applications that have already been running on the second apparatus, and receives a list of applications returned by the second apparatus according to the request, the list of applications including application identifiers of applications that have already been running on the second apparatus; or the first apparatus transmits, to the second apparatus a request for obtaining applications that have not been running on the second apparatus, and receives a list of applications returned by the second apparatus according to the request, the list of applications including application identifiers of applications that have not been running on the second apparatus; or, the first apparatus may also transmit to the second apparatus a request for obtaining all of the applications in the second apparatus, and receive a list of applications returned by the second apparatus according to the request, each application identifier in the list of applications may further contain information on whether a corresponding application has already been started.

Step 102: Detecting a first operation.

The first operation may specifically be an input operation executed by an input device, the input device may include a mouse, a keyboard, a touch panel etc., wherein the touch panel may be set separately, and may also be set overlapped with a display unit to form a touch screen.

Step 103: When the first operation satisfies a first preset condition, determining an application identifier for the first application from the at least one application identifier.

The first operation satisfies a first preset condition may specifically be that, an operation object of the input operation executed through the input device is an application identifier among the at least one application identifier, and an application identifier to which the first operation corresponds is determined as the application identifier of the first application.

Step 104: Detecting a second operation.

The second operation may specifically be an operation executed on the application identifier of the first application through the input device, i.e., an operation executed on the preceding, determined application identifier of the first application. Typically, the input device may include a mouse, a keyboard, a touch panel etc., wherein the touch panel may be set separately, and may also be set overlapped with a display unit to form a touch screen.

Step 105: When the second operation satisfies a second preset condition, obtaining a corresponding application manage command according to the second operation.

The second operation satisfies a second preset condition may specifically be that the operation on the application identifier of the first application is an operation corresponding to a preset manage command, wherein the manage command may include, but not limited to, a switch command, a close command, and a start command etc. corresponding to the first application.

Step 106: Transmitting the application manage command to the second apparatus, so that the second apparatus manages the first application according to the application manage command.

Transmitting the application manage command to the second apparatus may include: transmitting to the second apparatus a switch command of switching to the second state, so that the second apparatus executes the first application in the second state, or transmitting to the second apparatus a close command of closing the first application, so that the second apparatus ends progress of the first application; or transmitting to the second apparatus a start command of starting the first application, so that the second apparatus starts the first application.

Embodiments of the application management method of the present disclosure may be applied to a first apparatus connected with a second apparatus, such as a smart phone and a notebook computer that are connected; preferably, the two connected apparatuses can form a dual-system portable terminal, wherein the first apparatus includes a first hardware system, such as a hardware system based on a processor with X86 architecture or ARM architecture, runs a first operating system, such as a desktop device operating system (such as Windows, Linux or MacOS, etc.) or a portable device operating system (such as Android, Symbian, or iOS, etc.), the second apparatus includes a second hardware system, such as a hardware system based on a processor with X86 architecture or ARM architecture, runs a second operating system, such as a desktop device operating system (such as Windows, Linux or MacOS, etc.) or a portable apparatus operating system (such as Android, Symbian iOS or the like), at least one application is installed in the second operating system of the second apparatus. It can be seen that, the first hardware system and second hardware system may be based on the same architecture, or on different architectures; the first operating system and the second operating system may be the same type of operating system, and may also be different types of operating system. For example, the first apparatus is an apparatus that is based on a processor with X86 architecture and runs the Windows operating system, and the second apparatus is an apparatus that is based on a processor with ARM architecture and runs the Android operating system; or that the first apparatus is an apparatus that is based on a processor with X86 architecture and runs the Windows operating system, and the second apparatus is an apparatus that is based on a processor with ARM architecture and runs the Windows (e.g., Windows8) operating system.

In addition, the first apparatus and the second apparatus being such termed may be to distinguish the two apparatuses according to importance or priority or processing capability or power consumption (e.g., the first apparatus corresponds to high importance, high priority, high processing capability or high power consumption, while the second apparatus is the opposite; or the second apparatus corresponds to high importance, high priority, high processing capability or high power consumption, while the first apparatus is the opposite), may also be to differentiate the names, rather than to define importance or priority or processing capability or power consumption of the systems.

In the formed dual system, the first apparatus further includes a display unit, a first state of the first apparatus is that the display unit displays an operating state of the first operating system, and a second state of the first apparatus is that the display unit displays an operating state of the second operating system.

In a specific practice example, the first apparatus is, preferably, an apparatus including a host (including a first processing unit, such as an X86 processor) and a display screen, also known as a BASE apparatus, which is typically consistent with a commonly-seen laptop or all-in-one in terms of shape, the second apparatus may, preferably, be a board (including a second processing unit, such as an ARM processor) integrated with an independent operating system, also called a PAD apparatus, the board is plugged into a slot provided on the first apparatus, so as to combine a dual-system portable terminal together with the first apparatus;

In another specific practice example, the second display apparatus is, preferably, a host apparatus (including a second processor, such as X86 processor) including no display screen, the first apparatus is, preferably, a touch display apparatus (including a first processor, such as an ARM processor), a second operating system is installed in the second apparatus, a first operating system is installed in the first apparatus, the first apparatus is integrated with a display screen, the first apparatus and the second apparatus are connected together to form a dual-system portable terminal, the first apparatus and the second apparatus may be used separately or in combination.

Figure 2:
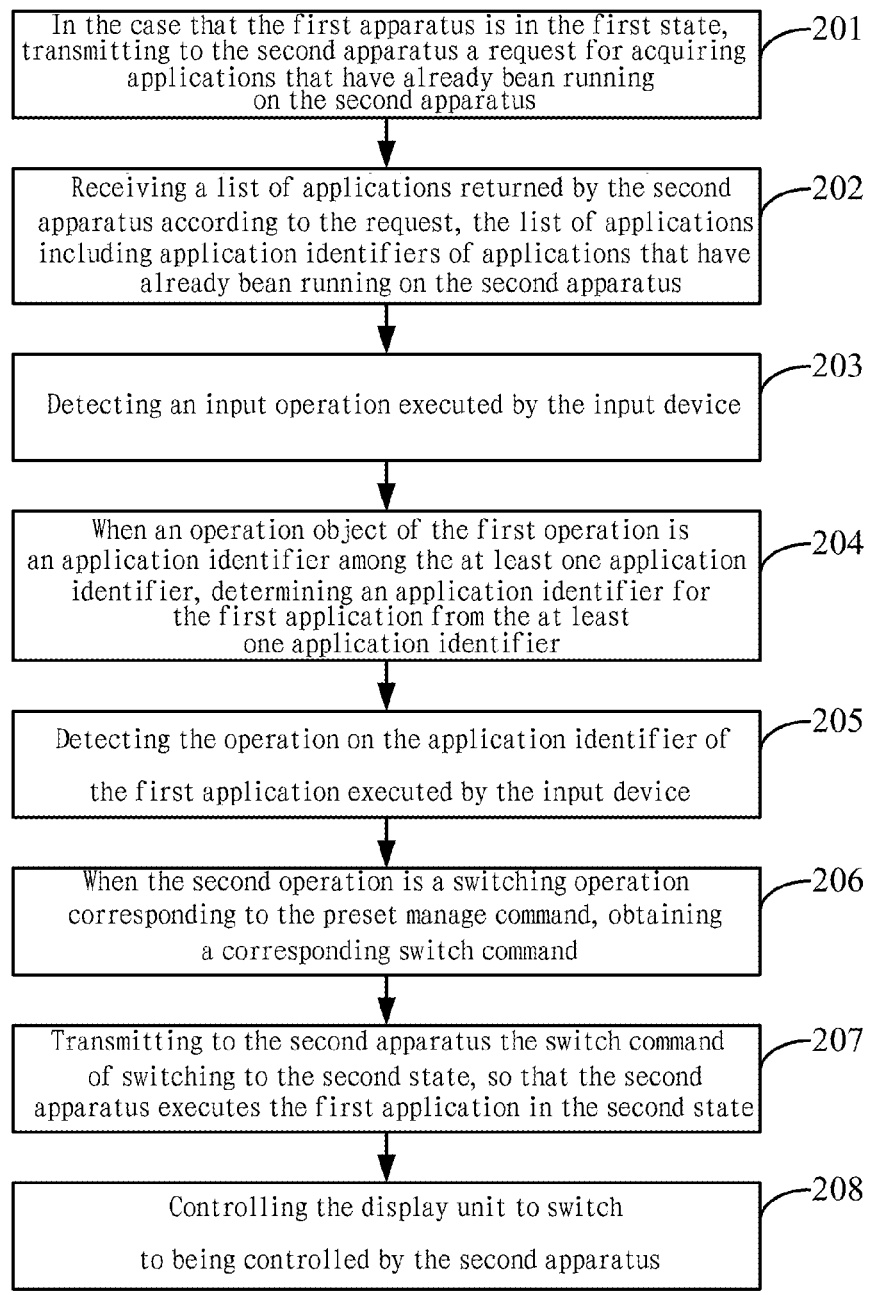
FIG. 2 is a flowchart of a second embodiment of the application management in the present disclosure.

Referring to FIG. 2, FIG. 2 is a flowchart of a second embodiment of the application management in the present disclosure, this embodiment shows an application management process of transmitting to the second apparatus a switch command:

Step 201: In the case that the first apparatus is in the first state, transmitting to the second apparatus a request for obtaining applications that have already been running on the second apparatus.

When the first apparatus connects with the second apparatus, the first apparatus may transmit to the second apparatus a request for obtaining applications that have already been running on the second apparatus via a wired (such as a data bus (USB/UART)) or wireless (such as WIFI) manner, wherein when the first apparatus is a BASE apparatus of a dual-system portable terminal, the BASE apparatus may transmit a request to the second apparatus through preset process (e.g., HybridService process).

Step 202: Receiving a list of applications returned by the second apparatus according to the request, the list of applications including application identifiers of applications that have already been running on the second apparatus.

After receiving the request, the second apparatus may search respective applications that have already been running, to obtain a list of these applications that have already been running, wherein when the second apparatus is a PAD apparatus of a dual-system portable terminal, the PAD apparatus may obtain a list of applications including application identifiers of the applications that have already been running through preset process (e.g., PADActivityManager process), and then return to the BASE apparatus the list of applications in a wired or wireless manner. Alternatively, the list of applications may also be obtained by the BASE apparatus from the internal of the PAD apparatus through preset process in a wired or wireless manner.

When the first apparatus receives the list of applications returned by the second apparatus according to the request, the first apparatus may display application identifiers of all the applications in the list of applications on a desktop to which the first operating system corresponds in the form of shortcut, or separately store application identifiers of all the applications in the list of applications in a certain folder (e.g., a folder named PADApp) for the user to view.

Step 203: Detecting an input operation executed by an input device.

The input device may include a mouse, a keyboard, a touch panel etc., wherein the touch panel may be set separately, and may also be set overlapped with a display unit to form a touch screen.

Step 204: When an operation object of the first operation is an application identifier among the at least one application identifier, determining an application identifier for the first application from the at least one application identifier.

Because, currently, it is in the first state, the first display unit displays the operating state of the first operating system, when it is detected in the first state that the operation object of the first operation is a certain application identifier in the list of applications, it can be determined that the application to which the application identifier corresponds is a first application, that is, currently, it is to perform manage operation on the first application among the applications that have already been started in the second apparatus.

Step 205: Detecting the operation on the application identifier of the first application executed by the input device.

The input device may include a mouse, a keyboard, a touch panel etc., wherein the touch panel may be set separately, and may also be set overlapped with a display unit to form a touch screen.

Step 206: When the second operation is a switching operation corresponding to the preset manage command, obtaining a corresponding switch command.

When it is determined that the second operation is an operation on the application identifier of the first application, it is possible to further determine what type of management is to be performed on the first application according to the user's selection. For example, with respect to an already-generated shortcut of the application identifier of the first application, when the user selects a switch option of the shortcut, then a corresponding switch command is generated to trigger a switching process of subsequently switching to the second state.

Step 207: Transmitting to the second apparatus the switch command of switching to the second state, so that the second apparatus executes the first application in the second state.

The first apparatus may transmit to the second apparatus the application name of the first application and the switch command in a wired or wireless manner. For example, when the BASE apparatus, as the first apparatus transmits to the PAD apparatus, as the second apparatus, the switch command, the PAD apparatus can activate the second operating system, continue executing the first application in the second operating system, and activate the first application to foreground of a display window for the user to view.

Step 208: Controlling the display unit to switch to being controlled by the second apparatus.

For the portable terminal having a dual system, the first apparatus may also control the display unit to switch to be controlled by the second electronic apparatus.

Figure 3:
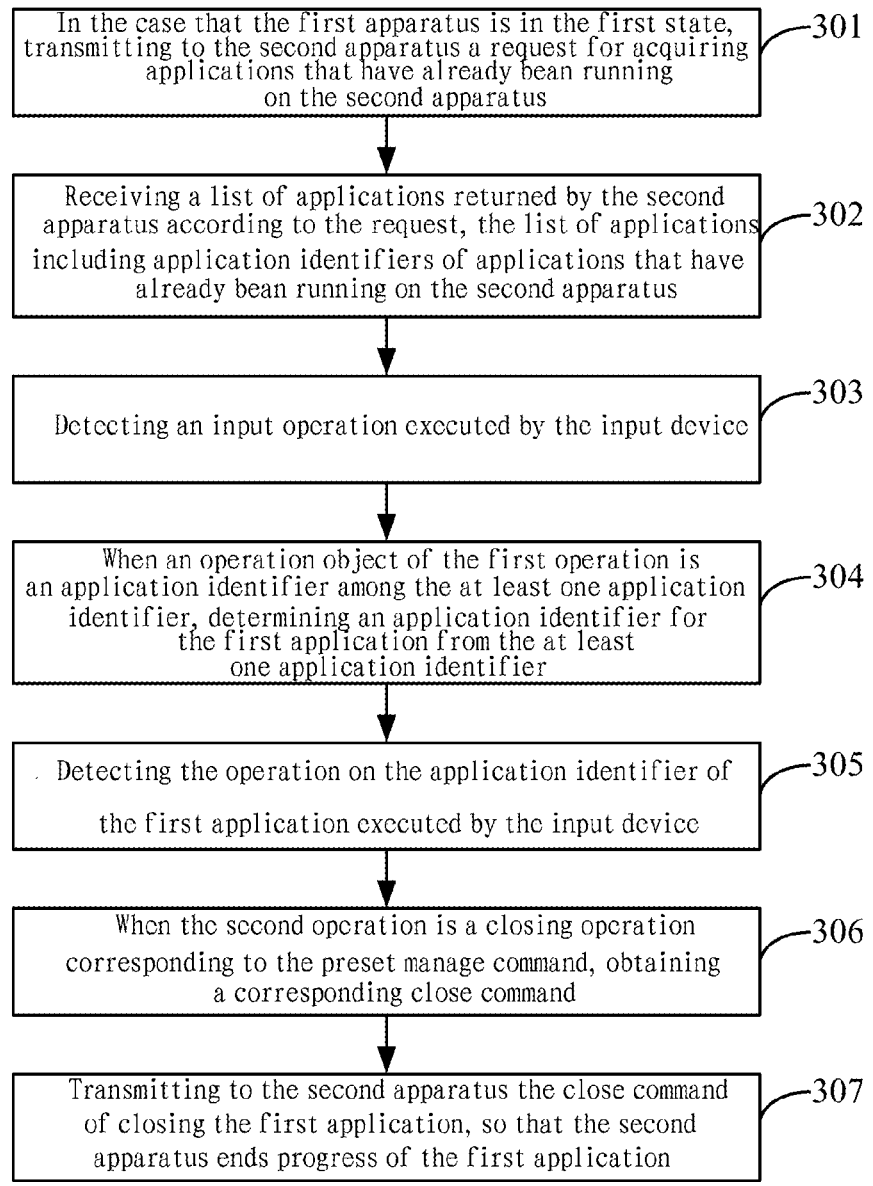
FIG. 3 a flowchart of a third embodiment of the application management in the present disclosure.

Referring to FIG. 3, FIG. 3 is a flowchart of a third embodiment of the application management in the present disclosure:

Step 301: In the case that the first apparatus is in the first state, transmitting to the second apparatus a request for obtaining applications that have already been running on the second apparatus.

When the first apparatus connects with the second apparatus, the first apparatus may transmit to the second apparatus a request for obtaining applications that have already been running on the second apparatus via a wired (such as a data bus (USB/UART)) or wireless (such as WIFI) manner, wherein when the first apparatus is a BASE apparatus of a dual-system portable terminal, the BASE apparatus may transmit a request to the second apparatus through preset process (e.g., HybridService process).

Step 302: Receiving a list of applications returned by the second apparatus according to the request, the list of applications including application identifiers of applications that have already been running on the second apparatus.

After receiving the request, the second apparatus may search respective applications that have already been running, to obtain a list of these applications that have already been running, wherein when the second apparatus is a PAD apparatus of a dual-system portable terminal, the PAD apparatus may obtain a list of applications including application identifiers of the applications that have already been running through preset process (e.g., PADActivityManager process), and then return to the BASE apparatus the list of applications in a wired or wireless manner. Alternatively, the list of applications may also be obtained by the BASE apparatus from the internal of the PAD apparatus through preset process in a wired or wireless manner.

When the first apparatus receives the list of applications returned by the second apparatus according to the request, the first apparatus may display application identifiers of all the applications in the list of applications on a desktop to which the first operating system corresponds in the form of shortcut, or separately store application identifiers of all the applications in the list of applications in a certain folder (e.g., a folder named PADApp) for user to view.

Step 303: Detecting an input operation executed by an input device.

The input device may include a mouse, a keyboard, a touch panel etc., wherein the touch panel may be set separately, and may also be set overlapped with a display unit to form a touch screen.

Step 304: When an operation object of the first operation is an application identifier among the at least one application identifier, determining an application identifier for the first application from the at least one application identifier.

Because, currently, it is in the first state, the first display unit displays the operating state of the first operating system, when it is detected in the first state that the operation object of the first operation is a certain application identifier in the list of applications, it can be determined that the application to which the application identifier corresponds is a first application, that is, currently, it is to perform manage operation on the first application among the applications that have already been started in the second apparatus.

Step 305: Detecting the operation on the application identifier of the first application executed by the input device.

The input device may include a mouse, a keyboard, a touch panel etc., wherein the touch panel may be set separately, and may also be set overlapped with a display unit to form a touch screen.

Step 306: When the second operation is a closing operation corresponding to the preset manage command, obtaining a corresponding close command.

When it is determined that the second operation is an operation on the application identifier of the first application, it is possible to further determine what type of management is to be performed on the first application according to the user's selection. For example, with respect to an already-generated shortcut of the application identifier of the first application, when the user selects a close option of the shortcut, then a corresponding close command is generated to trigger a closing process of subsequently closing the second state.

Step 307: Transmitting to the second apparatus the close command of closing the first application, so that the second apparatus ends progress of the first application.

The first apparatus may transmit to the second apparatus the application name of the first application and the close command in a wired or wireless manner. For example, when the BASE apparatus, as the first apparatus, transmits to the PAD apparatus, as the second apparatus, the close command, the PAD apparatus may perform an operation of closing the first application in background.

When the first application is closed, the second apparatus may further notify the first apparatus of a result of having already been closed, the first apparatus may delete the first application in the list of the applications that have already been started or mark the first application as having already been closed.

Figure 4:
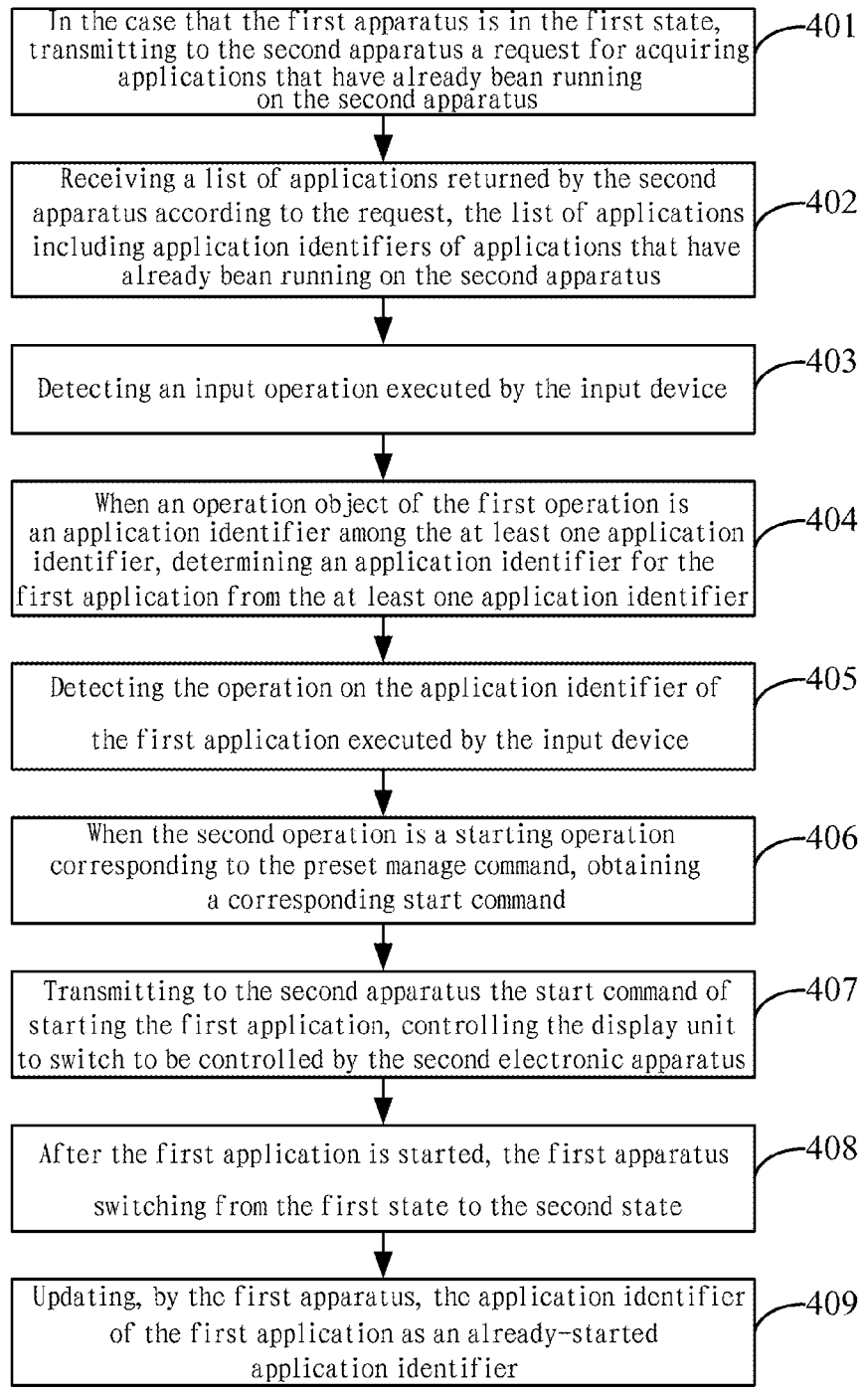
FIG. 4 is a flowchart of a fourth embodiment of the application management in the present disclosure.

Referring to FIG. 4, FIG. 4 is a flowchart of a fourth embodiment of the application management in the present disclosure:

Step 401: In the case that the first apparatus is in the first state, transmitting to the second apparatus a request for obtaining applications that have not been running on the second apparatus.

When the first apparatus connects with the second apparatus, the first apparatus may transmit to the second apparatus a request for obtaining applications that have not been running on the second apparatus via a wired (such as a data bus (USB/UART)) or wireless (such as WIFI) manner, wherein when the first apparatus is a BASE apparatus of a dual-system portable terminal, the BASE apparatus may transmit a request to the second apparatus through preset process (e.g., HybridService process).

Step 402: Receiving a list of applications returned by the second apparatus according to the request, the list of applications including application identifiers of applications that have not been running on the second apparatus.

After receiving the request, the second apparatus may search respective applications that have not been running but are available to be run, to obtain a list of these applications that have not been running, wherein when the second apparatus is a PAD apparatus of a dual-system portable terminal, the PAD apparatus can obtain a list of applications including application identifiers of the applications that have not been running through preset process (e.g., PADActivityManager process), and then return to the BASE apparatus the list of applications in a wired or wireless manner. Alternatively, the list of applications may also be obtained by the BASE apparatus from the internal of the PAD apparatus through preset process in a wired or wireless manner.

When the first apparatus receives the list of applications returned by the second apparatus according to the request, the first apparatus may display application identifiers of all the applications in the list of applications on a desktop to which the first operating system corresponds in the form of shortcut, or separately store application identifiers of all the applications in the list of applications in a certain folder (e.g., a folder named PADApp) for user to view.

Step 403: Detecting an input operation executed by an input device.

The input device may include a mouse, a keyboard, a touch panel etc., wherein the touch panel may be set separately, and may also be set overlapped with a display unit to form a touch screen.

Step 404: When an operation object of the first operation is an application identifier among the at least one application identifier, determining an application identifier for the first application from the at least one application identifier.

Because, currently, it is in the first state, the first display unit displays the operating state of the first operating system, when it is detected in the first state that the operation object of the first operation is a certain application identifier in the list of applications, it can be determined that the application to which the application identifier corresponds is a first application, that is, currently, it is to perform manage operation on the first application among the applications that have not been started in the second apparatus.

Step 405: Detecting the operation on the application identifier of the first application executed by the input device.

The input device may include a mouse, a keyboard, a touch panel etc., wherein the touch panel may be set separately, and may also be set overlapped with a display unit to form a touch screen.

Step 406: When the second operation is a starting operation corresponding to the preset manage command, obtaining a corresponding start command.

When it is determined that the second operation is an operation on the application identifier of the first application, it is possible to further determine what type of management is to be performed on the first application according to the user's selection. For example, with respect to an already-generated shortcut of the application identifier of the first application, when the user selects a start option of the shortcut or double-clicks the shortcut to trigger a start, then a corresponding start command is generated to trigger a starting process of subsequently starting the first application.

Step 407: Transmitting to the second apparatus the start command of starting the first application, controlling the display unit to switch to be controlled by the second electronic apparatus.

The first apparatus may transmit to the second apparatus the application name of the first application and the start command in a wired or wireless manner. For example, when the BASE apparatus, as the first apparatus, transmits to the PAD apparatus, as the second apparatus, the start command, the PAD apparatus may activate the second operating system to start and execute the first application in the second operating system, and activate the first application to foreground of a display window for the user to view. Further, for the portable terminal having a dual system, the first apparatus may also control the display unit to switch to be controlled by the second apparatus.

Step 408: After the first application is started, the first apparatus switching from the first state to the second state.

After the first application is started, the first apparatus controls the display unit to display the operating state of the second operating system, in this case, the first apparatus is switched to the second apparatus.

Step 409: Updating, by the first apparatus, the application identifier of the first application as an already-started application identifier.

The first apparatus may mark the application identifier of the first application in the list of applications, as an already-started application; or the first apparatus may also generate a list of already-started applications separately, and delete the first application from the list of applications that have not been started, and meanwhile add it to the list of already-started applications.

In the above-described embodiment, when the first application is started, the first apparatus may add the first application to a taskbar of the first operating system. If the user exits the first application in the second state, then the second apparatus may transmit to the first apparatus an exit command, so that the first apparatus makes the first application exit from the taskbar; the user may also switch back to the first state from the second state by operating a shortcut key or a physical button, and exit the first application in the taskbar of the first operating system, and then notify the second apparatus that the first application is already closed, and the second apparatus closes the first application in the second operating system, or after switching back to the first state, by clicking the first application in the taskbar, again it switches back to the second state, and the first application is executed in the second system.

Corresponding to the embodiments of the application management method in the present disclosure, the present disclosure also provides embodiments of an application management apparatus, which, as a first apparatus, connects with a second apparatus.

Figure 5:
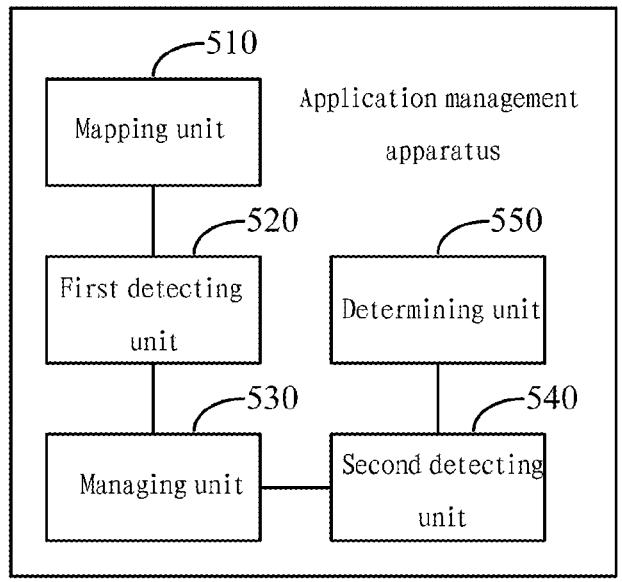
FIG. 5 is a block diagram of a first embodiment of the application management apparatus in the present disclosure.

Referring to FIG. 5, FIG. 5 is a block diagram of a first embodiment of the application management apparatus in the present disclosure:

The application management apparatus comprising:

a mapping unit 510 for mapping at least one application in the second apparatus, obtaining at least one corresponding application identifier;

a first detecting means 520 for detecting a first operation;

a determining unit 530 for, when the first operation satisfies a first preset condition, determining an application identifier for the first application from the at least one application identifier;

a second detecting unit 540 for detecting a second operation;

a managing unit 550 for, when the second operation satisfies a second preset condition, obtaining a corresponding application manage command according to the second operation, and transmitting the application manage command to the second apparatus, so that the second apparatus manages the first application according to the application manage command.

In the above-described embodiment, the first operation comprises: an input operation executed by an input device;

the first operation satisfies a first preset condition includes: an operation object of the input operation executed by the input device is an application identifier among the at least one application identifier;

the second operation includes: an operation on the application identifier of the first application executed by an input device;

the second operation satisfies a second preset condition includes: the operation on the application identifier of the first application is an operation corresponding to a preset manage command.

Figure 6:
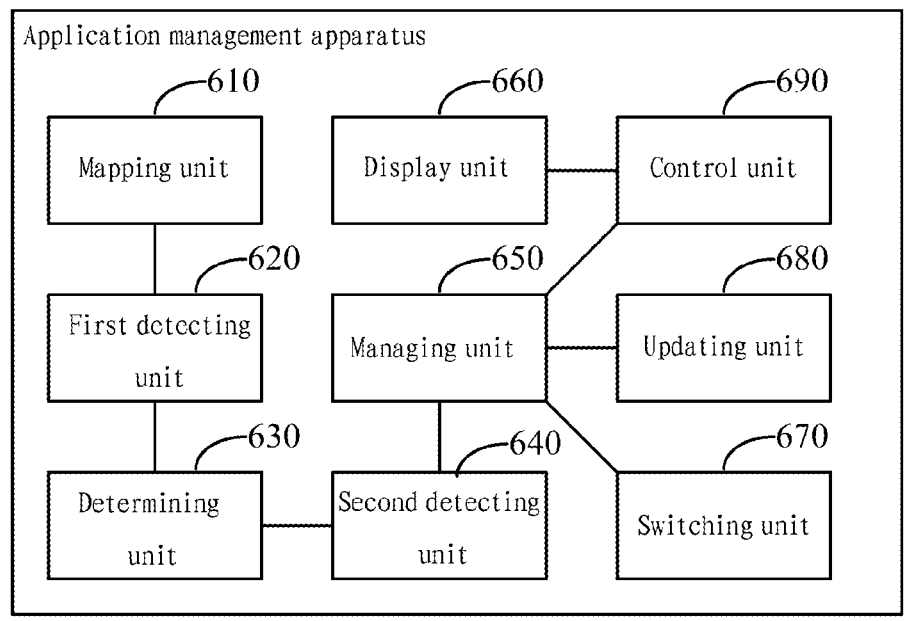
FIG. 6 is a block diagram of a second embodiment of the application management apparatus in the present disclosure.

Referring to FIG. 6, FIG. 6 is a block diagram of a second embodiment of the application management apparatus in the present disclosure:

The application management apparatus comprises:

a mapping unit 610 for mapping at least one application in the second apparatus, obtaining at least one corresponding application identifier;

a first detecting unit 620 for detecting a first operation;

a determining unit 630 for, when the first operation satisfies a first preset condition, determining an application identifier for the first application from the at least one application identifier;

a second detecting unit 640 for detecting a second operation;

a managing unit 650 for, when the second operation satisfies a second preset condition, obtaining a corresponding application manage command according to the second operation, and transmitting the application manage command to the second apparatus, so that the second apparatus manages the first application according to the application manage command.

Further, a first operating system is run on the first apparatus, a second operating system is run on the second apparatus, the at least one application is installed in the second operating system; the first apparatus further comprises:

a display unit 660, a first state of the first apparatus is that the display unit displays an operating state of the first operating system, and a second state of the first apparatus is that the display unit displays an operating state of the second operating system.

In an embodiment, the mapping unit 610 may comprise at least one of the following units (not shown in FIG. 6):

a first mapping unit for transmitting to the second apparatus a request for obtaining applications that have already been running on the second apparatus, receiving a list of applications returned by the second apparatus according to the request, the list of applications including application identifiers of applications that have already been running on the second apparatus;

a second mapping unit for transmitting to the second apparatus a request for obtaining applications that have not been running on the second apparatus, receiving a list of applications returned by the second apparatus according to the request, the list of applications including application identifiers of applications that have not been running on the second apparatus.

In a first embodiment of the managing unit 650, the managing unit 650 may include (not shown in FIG. 6):

a switching managing unit for, when the first apparatus is in the first state and when the first mapping unit transmits to the second apparatus a request for obtaining applications that have already been running on the second apparatus, transmitting to the second apparatus a switch command of switching to the second state, so that the second apparatus executes the first application in the second state.

In a second embodiment of the managing unit 650, the managing unit 650 may include (not shown in FIG. 6):

a closing managing unit for, when the first apparatus is in the first state and when the first mapping unit transmits to the second apparatus a request for obtaining applications that have already been running on the second apparatus, transmitting to the second apparatus a close command of closing the first application, so that the second apparatus ends progress of the first application.

In a third embodiment of the managing unit 650, the managing unit 650 may include (not shown in FIG. 6):

a starting managing unit when the first apparatus is in the first state and when the first mapping unit transmits to the second apparatus a request for obtaining applications that have not been running on the second apparatus, transmitting to the second apparatus a start command of starting the first application.

Further, the apparatus may further comprise:

a switching unit 670 for, when the first application is started, switching the first apparatus from the first state to the second state.

an updating unit 680 for, when the first application is started, marking, by the first apparatus, the application identifier of the first application as an already-started application identifier.

When applying the first and third embodiments of the managing unit 650, the application management apparatus may further comprise:

a control unit 690 for, when the first apparatus is in the first state, controlling the display unit to switch to be controlled by the second apparatus.

In the above-described embodiments, the first operation includes: an input operation executed by an input device;

the first operation satisfies a first preset condition includes: an operation object of the input operation executed by the input device is an application identifier among the at least one application identifier;

the second operation includes: an operation on the application identifier of the first application executed by an input device;

the second operation satisfies a second preset condition includes: the operation on the application identifier of the first application is an operation corresponding to a preset manage command.

Through the above description of the implementations it can be known that, in the embodiments of the present disclosure, the first apparatus connects with the second apparatus, maps at least one application in the second apparatus to obtain at least one corresponding application identifier, detects a first operation, determines the application identifier for the first application from the at least one application identifiers when the first operation satisfies a first preset condition, detects a second operation, obtains a corresponding application manage command according to the second operation when the second operation satisfies a second preset condition, and transmits the application manage command to the second apparatus, thus causing the second apparatus to manage the first application according to the application manage command. By applying the embodiments of the present disclosure, it is possible to achieve management on applications in the second apparatus through the first apparatus, and when the two apparatuses work jointly, when the applications in the second apparatus need to be used, the applications in the second apparatus can be managed in the first apparatus, without switching to a state where the second apparatus operates separately, which thereby achieves switching between applications of different apparatuses, and improves user experience of a user using a hybrid system portable terminal.

The embodiments of the present disclosure may be applied to a hybrid architecture system composed by a first electronic apparatus and a second electronic apparatus, wherein the hybrid architecture system may be composed by two independent electronic apparatuses, may also be a portable electronic apparatus including a first electronic and a second electronic apparatus. For example, the hybrid architecture system may be composed by a notebook computer with an independent, single system and a smart phone, it may also be a notebook computer having a hybrid architecture system.

As mentioned above, the first electronic apparatus may include a first hardware system, such as a hardware system based on a processor with X86 architecture or ARM architecture. The second electronic apparatus may include a second hardware system, such as hardware system based on a processor with X86 architecture or ARM architecture. That is, the first hardware system and second hardware system may be based on the same architecture, or based on different architecture.

Further, the first electronic apparatus may comprise a first hardware system having a first operating system, such as a first hardware system installed with a desktop device operating system (such as Windows, Linux or MacOS, etc.) or a portable device operating system (such as Android, Symbian, or iOS, etc.). The second electronic apparatus may comprise a second hardware system having a second operating system, such as a second hardware system installed with a desktop device operating system (such as Windows, Linux or MacOS, etc.) or a portable device operating system (such as Android, Symbian, or iOS, etc.). That is, the first operating system and the second operating system may be the same type of operating system, and may also be different types of operating system, only if they can be run in the corresponding hardware systems. Preferably, the first electronic apparatus is based on an X86 architecture processor and installed with a desktop operating system, the second electronic apparatus is based on an ARM architecture processor and installed with a portable device operating system.

Figure 7:
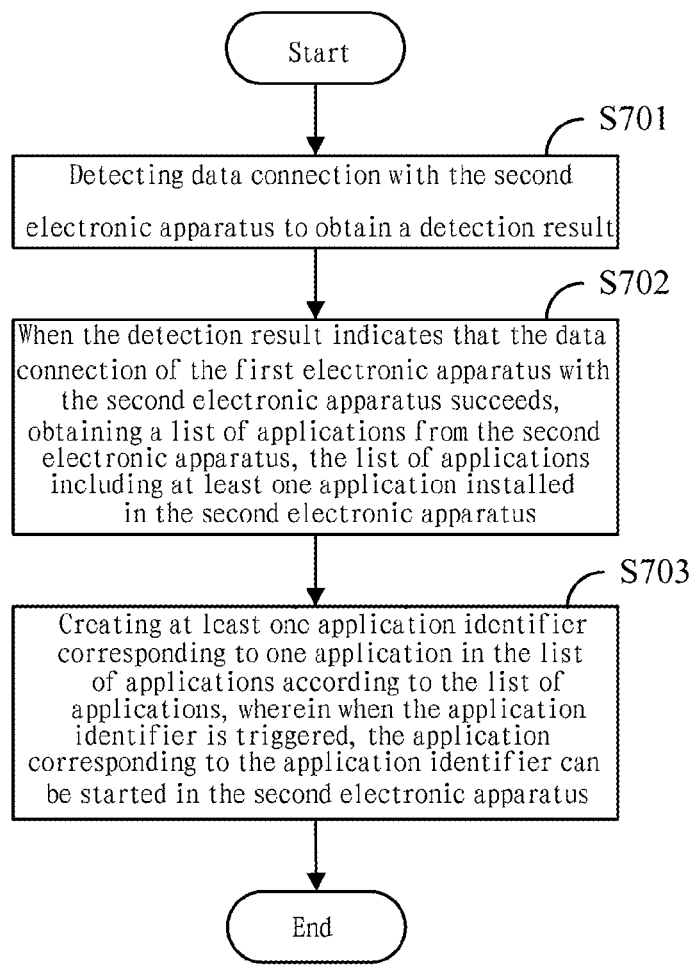
FIG. 7 is a flowchart illustrating the synchronization method according to an embodiment of the present disclosure.

Hereinafter, a synchronization method according to an embodiment of the present disclosure will be described with reference to FIG. 7. FIG. 7 is a flowchart illustrating the synchronization method according to an embodiment of the present disclosure, the synchronization method according to an embodiment of the present disclosure is applied to a first electronic apparatus (e.g., a host), and for synchronizing with a second electronic apparatus (e.g., a PAD), obtaining a list of applications installed in the second electronic apparatus.

The synchronization method according to an embodiment of the present disclosure comprises:

Step S701: Detecting data connection with the second electronic apparatus to obtain a detection result.

In this step, the first electronic apparatus detects whether the data connection with the second electronic apparatus succeeds in various manners, and obtains a detection result. For example, the first electronic apparatus may detect a state of the data connection with the second electronic apparatus in manners of polling and triggering etc., and obtains a detection result.

Step S702: When the detection result indicates that the data connection of the first electronic apparatus with the second electronic apparatus succeeds, obtaining a list of applications from the second electronic apparatus, the list of applications including at least one application installed in the second electronic apparatus.

In this step, when the detection result obtained in step S701 indicates that the data connection between the first electronic apparatus and the second electronic apparatus succeeds, the first electronic apparatus may obtain a list of applications from the second electronic apparatus, the list of applications including at least one application installed in the second electronic apparatus.

Further, for example, when the detection result obtained in step S701 indicates that the data connection between the first electronic apparatus and the second electronic apparatus succeeds, the first electronic apparatus may transmit to the second electronic apparatus a request for obtaining a list of applications installed in the second electronic apparatus, and then receive the list of applications transmitted by the second electronic apparatus in response to the request. In this process, the first electronic apparatus initiatively transmits to the second electronic apparatus a request for obtaining a list of applications in the second electronic apparatus, after receiving the request, the second electronic apparatus starts acquiring information on applications that have already been installed locally, then transmits to the first electronic apparatus the list of applications that have already been installed locally via a data channel that has already been established.

Alternatively, for example, when the detection result obtained in step S701 indicates that the data connection between the first electronic apparatus and the second electronic apparatus succeeds, the second electronic apparatus may automatically transmit the list of applications. In this process, when the data connection between the first electronic apparatus and the second electronic apparatus succeeds, the first electronic apparatus does not need to transmit to the second electronic apparatus a request for obtaining a list of applications in the second electronic apparatus, on the contrary, the second electronic apparatus may automatically transmit the list of applications, the first electronic apparatus may directly receive the list of applications including the applications installed in the second electronic apparatus as transmitted from the second electronic apparatus.

Further, the second electronic apparatus may for example package the list of local applications, and transmit it to the first electronic apparatus in the form of an XML file, wherein the XML file includes therein information on start mode and icon of each application etc.

Further, the first electronic apparatus may obtain from the second electronic apparatus a list of applications including all of the applications in the second electronic apparatus. That is, the first electronic apparatus can directly obtain a list of applications including all of the applications in the second electronic apparatus, regardless of whether applications in the second electronic have already existed locally therein.

Alternatively, the first electronic apparatus may obtain from the second electronic apparatus a list of applications including specified applications in the second electronic apparatus. That is, the first electronic apparatus may specify certain applications to be obtained from the second electronic apparatus, for example, by specifying name of an application, a list of applications including the application is obtained from the second electronic apparatus. Alternatively, by specifying name of a folder, a list of applications including all of the applications in the folder is obtained from the second electronic apparatus. Alternatively, when the operating system on the first electronic apparatus and the operating system on the second electronic apparatus are the same, if a particular application occupies 5% of CPU resources of the first electronic apparatus when it is running on the first electronic apparatus, and occupies 3% of CPU resources of the second electronic apparatus when it is running on the second electronic apparatus, then the first electronic apparatus can obtain a list of applications including this particular application from the second electronic apparatus in order to run this particular application on the second electronic apparatus. Alternatively, when the operating system on the first electronic apparatus and the operating system on the second electronic apparatus are the same, if power consumption of the first electronic apparatus is much higher than that of the second electronic apparatus, then, with respect to the same application on the first electronic apparatus and the second electronic apparatus, the first electronic apparatus can obtain from the second electronic apparatus a list of applications including the same application, to select to run the same application on the second electronic apparatus. Alternatively, when the operating system on the first electronic apparatus and the operating system on the second electronic apparatus are different, with respect to a particular application that can be running in only the operating system on the second electronic apparatus, the first electronic apparatus can obtain from the second electronic apparatus a list of applications including this specific application. Of course, specified manners are not limited thereto, the user can specify his/her expected applications in arbitrary manners.

Alternatively, the first electronic apparatus obtains from the second electronic apparatus a list of applications including updated applications, wherein the second electronic apparatus has already stored therein a list of applications previously transmitted. That is, the list of applications previously transmitted may be stored in the second electronic apparatus by, for example, a log file, at the next time when the list of applications is to be transmitted, the second electronic apparatus may, by consulting the already-stored list of applications, transmit to the first electronic apparatus the list of applications including only updated applications.

Alternatively, the first electronic apparatus may transmit to the second electronic apparatus a list of applications including applications to which already-existed application identifiers correspond, and obtain from the second electronic apparatus a list of applications including updated applications, wherein the second electronic apparatus has not stored therein a list of applications previously transmitted. That is, when there is no the list of applications previously transmitted in the second electronic apparatus, the first electronic apparatus may transmit to the second electronic apparatus a list of applications including applications to which the locally-existed identifiers correspond, after receiving this list of applications, the second electronic apparatus compares it with the local applications, and transmit to the first electronic apparatus a list of applications including the applications that have already been updated. That is, it is not necessary for the second electronic apparatus to transmit the first electronic apparatus a list of all applications installed locally, instead, it may selectively transmit to the first electronic apparatus a list of applications including part of applications according to situations, thereby reducing the amount of data communication.

Step S703: Creating at least one application identifier corresponding to one application in the list of applications according to the list of applications, wherein after the application identifier is triggered, the application corresponding to the application identifier can be started in the second electronic apparatus.

In this step, after receiving the application list, the first electronic apparatus may, based on the list of applications, locally create at least one application identifier corresponding to one application in the list of applications according to the list of applications. That is, the first electronic apparatus locally creates a corresponding application identifier, such as startup icon, shortcut etc., for each application in the list of applications according to the received list of applications. And, after the application identifier is triggered, it is possible to start the application corresponding to the application identifier in the second electronic apparatus. That is, after triggering the application identifier created on the first electronic apparatus, the application corresponding to this application identifier in the second electronic apparatus is in an activable state. Then, this application may be started by e.g. a re-confirmation of the user etc.

Further, after the application identifier created on the first electronic apparatus is triggered, the application corresponding to the application identifier in the second electronic apparatus may be started immediately without the user's re-confirmation.

Further, the first electronic apparatus includes a display unit, the method further comprising: when the application corresponding to application identifier is started in the second electronic apparatus, displaying on the display unit a running interface of the second electronic apparatus. That is, in this step, when starting the application to which the application identifier corresponds in the second electronic apparatus, a running interface of the second electronic apparatus should be displayed on the display unit. Further, contents originally displayed on the display unit may be maintained or not maintained. For example, when contents originally displayed on the display unit are maintained, the running interface of the second electronic apparatus may be displayed simultaneously through techniques such as split-screen display, Picture-in-Picture display etc. Alternatively, when contents originally displayed on the display unit are not maintained, the entire display screen of the display unit may be switched to the running interface of the second electronic apparatus.

Further, when running interface of the second electronic apparatus is displayed, it may display an application running window including the application to which the application identifier corresponds. Alternatively, the application is running in background of the second electronic apparatus, its running window is not displayed, only the identifier corresponding thereto is displayed (such as displaying an identifier indicating the application in a status bar or any bar). Alternatively, the application is running in background of the second electronic apparatus, no contents associated with the application are displayed.

In addition, there may be a variety of ways to start the data connection of the first electronic apparatus with the second electronic apparatus. For example, a triggering unit may be provided on the first electronic apparatus, such as a hardware unit like a key, a button, or a software unit corresponding to a predetermined command like an icon, a shortcut, thereafter, the wireless connection with the second electronic apparatus is started such as Bluetooth, WiFi, wireless LAN connection and so on based on the operation executed by the user on the triggering unit.

Alternatively, some physical interfaces may be provided on the first electronic apparatus (such as a USB interface, a network interface, an HDMI interface etc.), when physical connection with the second electronic apparatus is made through the physical interface, the data connection with the second electronic apparatus is started.

Finally, when the first electronic apparatus disconnects with the second electronic apparatus, it may automatically delete the already-created application identifiers. Of course, it may also not delete the already-created application identifiers.

In the case of deleting the already-created application identifiers when the first electronic apparatus disconnects with the second electronic apparatus, the first electronic apparatus needs to create a plurality of application identifiers one by one corresponding to all of the applications in the received list of applications. For example, when the received list of applications includes Application 1, Application 2, and Application 3, the first electronic apparatus creates Application Identifier 1, Application Identifier 2, and Application Identifier 3 one by one corresponding to Application 1, Application 2, and Application 3.

In the case of not deleting the already-created application identifiers when the first electronic apparatus disconnects with the second electronic apparatus, the first electronic apparatus may compare all of the applications in the list of applications with the applications to which the already-existed application identifiers correspond, and create and/or delete application identifiers corresponding to updated applications based on a comparison result. For example, when the received list of applications includes Application 1, Application 2, and Application 4, since Application Identifier 1, Application Identifier 2, and Application Identifier 3 have already been created last time, the first electronic apparatus compares Application 1, Application 2, and Application 4 included in the received list of applications with Application 1, Application 2, and Application 3 to which the already-existed Application Identifier 1, Application Identifier 2, and Application Identifier 2, determines that currently in the second electronic apparatus, Application 3 is deleted and Application 4 is added. Accordingly, the first electronic apparatus deletes the already-crated Application Identifier 3 corresponding to Application 3, and meanwhile create Application Identifier 4 corresponding to Application 4.

In addition, an update requesting unit may be provided on the first electronic apparatus, such as a hardware unit like a key, a button, or a software unit corresponding to a predetermined command like an icon, a shortcut.

When the user operates on the update request unit, in this case, if the data connection of the first electronic apparatus and the second electronic apparatus is in a successful connection state, then an update request is transmitted to the second electronic apparatus.

If the data connection of the first electronic apparatus and the second electronic apparatus is in an unsuccessful connection state, then the update request is recorded in a recording unit of the first electronic apparatus (such as a memory), and when the data connection of the first electronic apparatus with the second electronic apparatus is in a successful connection state, the update request recorded in the recording unit is read and transmitted to the second electronic apparatus.

After receiving the update request, if the second electronic apparatus detects updated applications existed in the local in response to the update request, then the second electronic apparatus transmits to the first electronic apparatus the list of applications including the updated applications, the first electronic apparatus may create and/or delete the application identifiers corresponding to the updated applications according to the received list of applications.

Accordingly, by providing an update unit on the first electronic apparatus, the user can manually start synchronization with the second electronic apparatus according to needs during using process.

Figure 8:
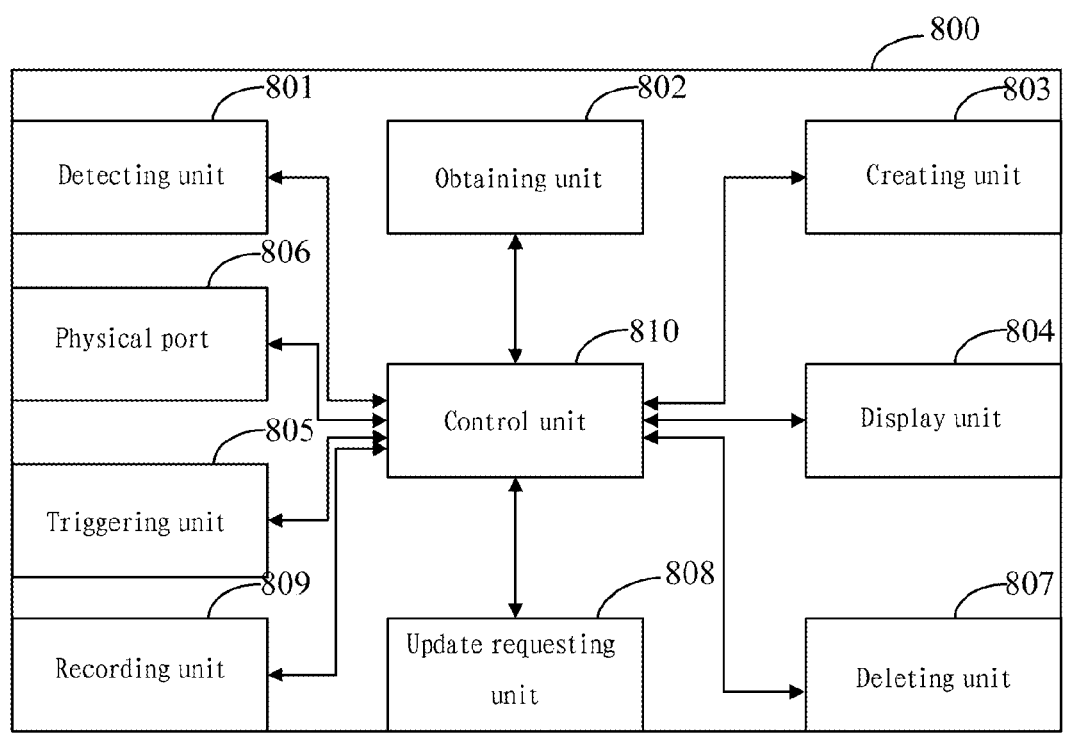
FIG. 8 is a block diagram illustrating configuration of the electronic apparatus according to an embodiment of the present disclosure.

Hereinafter a block diagram illustrating configuration of the electronic device according to an embodiment of the present disclosure will be described referencing to FIG. 8.

The electronic apparatus 800 according to this embodiment comprises: a detecting unit 801 configured for detecting data connection with the second electronic apparatus to obtain a detection result;

an obtaining unit 802 configured for, when the detection result indicates that the data connection of the first electronic apparatus with the second electronic apparatus succeeds, obtaining a list of applications from the second electronic apparatus, the list of applications including at least one application installed in the second electronic apparatus; and a creating unit 803 configured for, creating at least one application identifier corresponding to one application in the list of applications according to the list of applications, wherein after the application identifier is triggered, the application corresponding to the application identifier can be started in the second electronic apparatus.

After the application identifier is triggered, the application corresponding to the application identifier can be started in the second electronic apparatus.

The electronic apparatus 800 further comprises a display unit 804, configured for, when the application corresponding to application identifier is started in the second electronic apparatus, displaying on the display unit a running interface of the second electronic apparatus.

When the detection result indicates that the data connection of the electronic apparatus 800 with the second electronic apparatus succeeds, the obtaining unit 802 transmits to the second electronic apparatus a request for obtaining a list of applications installed in the second electronic apparatus, and thereafter receives the list of applications transmitted by the second electronic apparatus in response to the request; or when the detection result indicates that the data connection of the electronic apparatus 800 with the second electronic apparatus succeeds, the obtaining unit 802 receives the list of applications automatically transmitted by the second electronic apparatus.

The electronic apparatus 800 further comprises a triggering unit 805 configured for starting wireless connection with the second electronic apparatus based on an operation executed by user on the triggering unit, wherein the triggering unit 805 is a key provided on the electronic apparatus or an identifier corresponding to a predetermined command.

The electronic apparatus 800 also comprises a physical interface 806 configured for, when physical connection with the second electronic apparatus is made through the physical interface 806, starting the data connection with the second electronic apparatus.

The obtaining unit 802 is further configured for: obtaining from the second electronic apparatus a list of applications including all of the applications in the second electronic apparatus; or obtaining from the second electronic apparatus a list of applications including specified applications in the second electronic apparatus; or obtaining from the second electronic apparatus a list of applications including updated applications, wherein the second electronic apparatus has already stored therein a list of applications previously transmitted; or transmitting to the second electronic apparatus a list of applications including applications to which already-existed application identifiers correspond, and obtaining from the second electronic apparatus a list of applications including updated applications, wherein the second electronic apparatus has not stored therein a list of applications previously transmitted.

The electronic apparatus 800 further comprises a deleting unit 807 configured for, when the first electronic apparatus disconnects with the second electronic apparatus, deleting the already-created application identifiers.

The creating unit 802 is further configured for: in the case of deleting the already-created application identifiers when the first electronic apparatus disconnects with the second electronic apparatus, creating a plurality of application identifiers one by one corresponding to all of the applications in the received list of applications; or in the case of not deleting the already-created application identifiers when the first electronic apparatus disconnects with the second electronic apparatus, comparing all of the applications in the list of applications with the applications to which the already-existed application identifiers correspond, and creating and/or deleting application identifiers corresponding to updated applications based on a comparison result.

The electronic apparatus further comprises an update requesting unit 808 configured for, when a user operates on the update requesting unit, wherein the update requesting unit is a key provided on the electronic apparatus or an identifier corresponding to a predetermined command, if the data connection of the electronic apparatus 800 with the second electronic apparatus succeeds, then transmitting to the second electronic apparatus an update request; and if the data connection of the electronic apparatus 800 with the second electronic apparatus does not succeed, then recording in a recording unit 809 of the first electronic apparatus the update request, and when the data connection of the first electronic apparatus with the second electronic apparatus succeeds, reading the update request recorded in the recording unit 809 and transmitting it to the second electronic apparatus.

The creating unit 809 is further configured for: if the second electronic apparatus detects updated applications in response to the update request, then receiving from the second electronic apparatus the list of applications including the updated applications, and creating and/or deleting the application identifiers corresponding to the updated applications according to the received list of applications The electronic apparatus 800 further comprises a control unit 810 that controls operations of respective units.

By means of the synchronization method and the electronic apparatus according to the present disclosure, it is convenient to obtain the list of applications installed in another electronic apparatus, and create application identifiers corresponding to these applications, thus conveniently starting applications installed in the another electronic apparatus.

As mentioned above, the embodiments of the present application may be applied to a hybrid architecture system composed by a first electronic apparatus and a second electronic apparatus, wherein the hybrid architecture system may be composed by two independent electronic apparatuses, may also be a portable electronic apparatus including a first electronic and a second electronic apparatus. For example, the hybrid architecture system may be composed by a notebook computer with an independent, single system and a smart phone, it may also be a notebook computer having a hybrid architecture system.

The first electronic apparatus may include a first hardware system, such as a system based on a processor with X86 architecture or ARM architecture. The second electronic apparatus may include a second hardware system, such as a system based on a processor with X86 architecture or ARM architecture. That is, the first hardware system and second hardware system may be based on the same architecture, or based on different architectures.

Further, the first electronic apparatus may comprise a first hardware system having a first operating system, such as a first hardware system installed with a desktop device operating system (such as Windows, Linux or MacOS, etc.) or a portable device operating system (such as Android, Symbian, or iOS, etc.). The second electronic apparatus may comprise a second hardware system having a second operating system, such as a second hardware system installed with a desktop device operating system (such as Windows, Linux or MacOS, etc.) or a portable device operating system (such as Android, Symbian, or iOS, etc.). That is, the first operating system and the second operating system may be the same type of operating system, and may also be different types of operating system, only if they can be run in the corresponding hardware systems. Preferably, the first electronic apparatus is of a system based on an X86 architecture processor and installed with a desktop operating system, the second electronic apparatus is a system based on an ARM architecture processor and installed with a portable device operating system.

Figure 9:
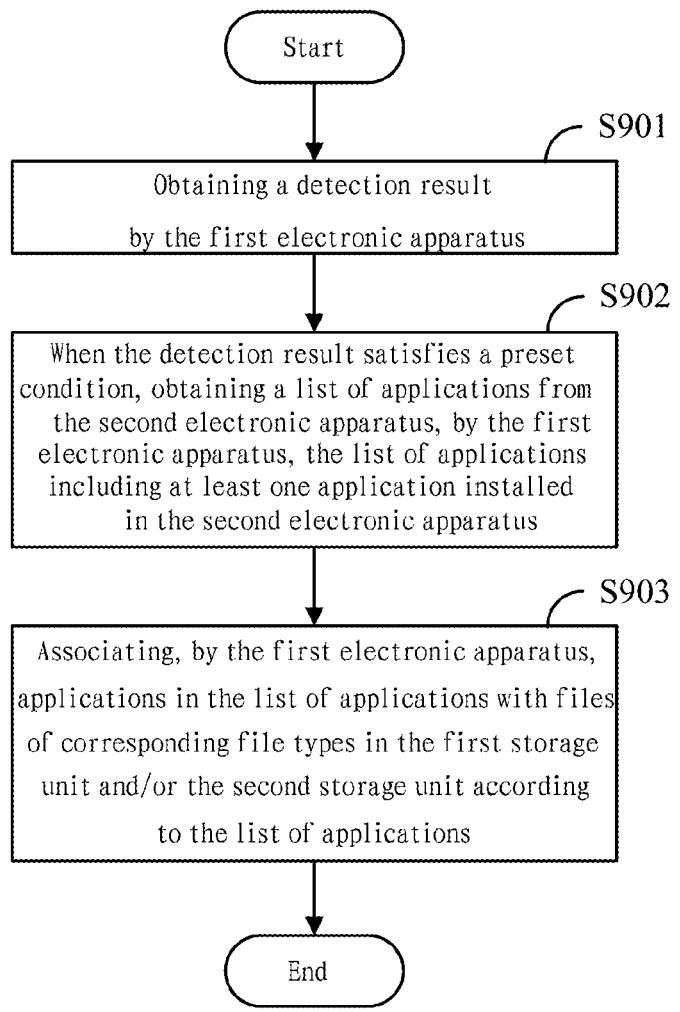
FIG. 9 is a flowchart illustrating the association method according to an embodiment of the present disclosure.

An association method according to an embodiment of the present disclosure will be described with reference to FIG. 9. FIG. 9 is a flowchart illustrating the association method according to an embodiment of the present application. The association method according to an embodiment of the present application is applied to a first electronic apparatus (e.g., a host), and for obtaining a list of applications installed in a second electronic apparatus (e.g., a PAD), and associating the obtained applications with files of corresponding file types in storage units on the first electronic apparatus and the second electronic apparatus. The first electronic apparatus has a first storage unit in which various types of data such as images, movies, documents, tables, games and so on may be stored. The second electronic apparatus has a second storage unit in which various types of data the same as those in the first storage unit may be stored. After the first electronic apparatus connects with the second electronic apparatus, it may directly access the second storage unit of the second electronic apparatus.

An association method according to an embodiment of the present disclosure will be described with reference to FIG. 9. The association method is applied to a first electronic apparatus having a first storage unit and a second electronic apparatus having a second storage unit.

The association method according to a first embodiment of the present disclosure comprises:

S901: Obtaining a detection result by the first electronic apparatus.

In this step, the first electronic apparatus may detect whether the data connection with the second electronic apparatus succeeds in various manners, and obtains a detection result. For example, the first electronic apparatus may detect a state of the data connection with the second electronic apparatus in manners of polling and triggering etc., and obtains a detection result.

S902: When the detection result satisfies a preset condition, obtaining a list of applications from the second electronic apparatus, by the first electronic apparatus, the list of applications including at least one application installed in the second electronic apparatus.

In this step, first, it is determined whether the detection result in step S901 satisfies a preset condition, thereafter, when the preset condition is satisfied, a list of applications is obtained from the second electronic apparatus, the list of applications includes at least one application installed in the second electronic apparatus.

For example, the preset condition may be that when the detection result indicates that the data connection of the first electronic apparatus with the second electronic apparatus succeeds. That is, in this case, when the data connection of the first electronic apparatus and the second electronic apparatus succeeds, the list of applications is automatically obtained from the second electronic apparatus.

For example, the preset condition may also be that the data connection of the first electronic apparatus with the second electronic apparatus succeeds, and also a requesting unit on the first electronic apparatus is operated, the requesting unit is a key provided on the first electronic apparatus or an identifier corresponding to a predetermined command, and is for transmitting to the second electronic apparatus a request for obtaining the list of applications. That is, in this case, when the data connection of the first electronic apparatus with the second electronic apparatus succeeds, the list of applications is not automatically obtained from the second electronic apparatus, instead, when the user operates on the requesting unit provided on the first electronic apparatus, a request for obtaining the list of applications is transmitted to the second electronic apparatus, thereafter the list of applications is obtained from the second electronic apparatus. In this case, the condition that needs to be satisfied is that, the data connection of the first electronic apparatus with the second electronic apparatus succeeds, and also the user operates on the requesting unit to manually request to obtain the list of applications from the second electronic apparatus. As compared with the case of automatically obtaining the list of applications, this way of manually requesting to obtain the list of applications perform no operations when the connection is just established, thus saving power.

Further, for example, when the detection result obtained in step S901 indicates that the data connection between the first electronic apparatus and the second electronic apparatus succeeds, the first electronic apparatus may transmit to the second electronic apparatus a request for obtaining a list of applications installed in the second electronic apparatus, and then receive the list of applications transmitted by the second electronic apparatus in response to the request. In this process, the first electronic apparatus initiatively transmits to the second electronic apparatus a request for obtaining a list of applications in the second electronic apparatus, after receiving the request, the second electronic apparatus starts acquiring information on applications that have already been installed locally, then transmits to the first electronic apparatus the list of applications that have already been installed locally via a data channel that has already been established.

Alternatively, for example, when the detection result obtained in step S901 indicates that the data connection between the first electronic apparatus and the second electronic apparatus succeeds, the second electronic apparatus may automatically transmit the list of applications. In this process, when the data connection between the first electronic apparatus and the second electronic apparatus succeeds, the first electronic apparatus does not need to transmit to the second electronic apparatus a request for obtaining a list of applications in the second electronic apparatus, on the contrary, the second electronic apparatus may automatically transmit the list of applications, the first electronic apparatus may directly receive the list of applications including the applications installed in the second electronic apparatus as transmitted from the second electronic apparatus.

Further, the second electronic apparatus may for example package the list of local applications, and transmit it to the first electronic apparatus in the form of an XML file, wherein the XML file includes therein information on start mode and icon of each application.

Further, the first electronic apparatus may obtain from the second electronic apparatus a list of applications including all of the applications in the second electronic apparatus. That is, the first electronic apparatus may directly obtain a list of applications including all of the applications in the second electronic apparatus, regardless of whether applications in the second electronic have already existed locally therein.

Alternatively, the first electronic apparatus may obtain from the second electronic apparatus a list of applications including specified applications in the second electronic apparatus. That is, the first electronic apparatus can specify certain applications to be obtained from the second electronic apparatus, for example, by specifying name of an application, a list of applications including the application is obtained from the second electronic apparatus, or, by specifying name of a folder, a list of applications including all of the applications in the folder is obtained from the second electronic apparatus. Alternatively, when the operating system on the first electronic apparatus and the operating system on the second electronic apparatus are the same, if a particular application occupies 5% of CPU resources of the first electronic apparatus when it is running on the first electronic apparatus, and occupies 3% of CPU resources of the second electronic apparatus when it is running on the second electronic apparatus, then the first electronic apparatus may obtain a list of applications including this particular application from the second electronic apparatus in order to run this particular application on the second electronic apparatus. Alternatively, when the operating system on the first electronic apparatus and the operating system on the second electronic apparatus are the same, if power consumption of the first electronic apparatus is much higher than that of the second electronic apparatus, then, with respect to the same application on the first electronic apparatus and the second electronic apparatus, the first electronic apparatus may obtain from the second electronic apparatus a list of applications including the same application, to select to run the same application on the second electronic apparatus. Alternatively, when the operating system on the first electronic apparatus and the operating system on the second electronic apparatus are different, with respect to a particular application that can be running in only the operating system on the second electronic apparatus, the first electronic apparatus can obtain from the second electronic apparatus a list of applications including this specific application. Of course, specified manners are not limited thereto, the user can specify his/her expected applications in arbitrary manners.

Alternatively, the first electronic apparatus obtains from the second electronic apparatus a list of applications including updated applications, wherein the second electronic apparatus has already stored therein a list of applications previously transmitted. That is, the list of applications previously transmitted may be stored in the second electronic apparatus by, for example, a log file, at the next time when the list of applications is to be transmitted, the second electronic apparatus can, by consulting the already-stored list of applications, transmit to the first electronic apparatus the list of applications including only updated applications.

Alternatively, the first electronic apparatus may transmit to the second electronic apparatus a list of applications including applications to which already-existed application identifiers correspond, and obtain from the second electronic apparatus a list of applications including updated applications, wherein the second electronic apparatus has not stored therein a list of applications previously transmitted. That is, when there is no the list of applications previously transmitted in the second electronic apparatus, the first electronic apparatus may transmit to the second electronic apparatus a list of applications including applications to which the locally-existed identifiers correspond, after receiving this list of applications, the second electronic apparatus compares it with the local applications, and transmit to the first electronic apparatus a list of applications including the applications that have already been updated. That is, it is not necessary for the second electronic apparatus to transmit the first electronic apparatus a list of all applications installed locally, instead, it may selectively transmit to the first electronic apparatus a list of applications including part of applications according to situations, thereby reducing the amount of data communication.

S903: Associating, by the first electronic apparatus, applications in the list of applications with files of corresponding file types in the first storage unit and/or the second storage unit according to the list of applications.

In this step, since, after the first electronic apparatus and the second electronic apparatus are connected, the second storage unit of the second electronic apparatus has already become a storage unit of the first electronic apparatus, the first electronic apparatus may directly access the second storage unit of the second electronic apparatus. Therefore, according to the list of applications, the first electronic apparatus associates applications in the list of applications with files of corresponding file types in the first storage unit and/or the second storage unit according to the list of applications. In this case, the files in the first storage unit and the second storage unit may be opened by applications installed in the first electronic apparatus, and may also be opened by applications installed in the second electronic apparatus.

In this case, there may be the following several cases:

1) when files are stored in a storage unit of the second electronic apparatus, and the storage unit of the second electronic apparatus serves as a shared unit of the first electronic apparatus, the first electronic apparatus can directly access the files stored in the storage unit of the second electronic apparatus.

2) when files are stored in the storage unit of the first electronic apparatus and are not accessible for the second electronic apparatus, the files are copied to a shared storage unit of the first electronic apparatus.

3) if the storage unit of the first electronic apparatus and that of the second electronic apparatus both are transparent, and there is no need to determine and copy, the first electronic apparatus and the second electronic apparatus both can directly access the files stored in each storage unit.

For example, when a movie file A.avi is stored in a storage unit of a host, after the host is connected to a PAD, since the PAD saves more power than the host, so the user wants to play the movie file A.avi with a video player in the PAD, according to the prior art, the user has two options: 1) first manually switching to the PAD terminal, and then opening a video player and selecting the movie file A.avi to play; 2) clicking a video player icon on desktop of the host, the system automatically switches to the PAD terminal and opens a video player, and then the user selects to play the movie file A.avi. Such operations are more complex, user experience is poor. However, according to the association method in this embodiment, since the applications on the PAD are already associated with the files in the storage unit on the host, when the user activates the movie file A.avi, a graphical user interface such as a pop-up menu can be displayed, and an option of "Play with MediaPlayer at PAD terminal" is displayed in the pop-up menu, the user can, by selecting "Play with MediaPlayer at PAD terminal", automatically switch to use the MediaPlayer at the PAD to play the movie file A.avi, thereby improving user experience.

In addition, there may be a variety of ways to start the data connection of the first electronic apparatus with the second electronic apparatus. For example, a triggering unit may be provided on the first electronic apparatus, such as a hardware unit like a key, a button etc., or a software unit corresponding to a predetermined command like an icon, a shortcut etc., thereafter, the wireless connection with the second electronic apparatus is started based on the operation executed by the user on the triggering unit, such as Bluetooth, WiFi, wireless LAN connection and so on.

Alternatively, some physical interfaces may be provided on the first electronic apparatus (such as a USB interface, a network interface, an HDMI interface etc.), when physical connection with the second electronic apparatus is made through the physical interface, the data connection with the second electronic apparatus is started.

In addition, the first electronic apparatus may also locally create at least one application identifier corresponding to one application in the list of applications.

In addition, when the first electronic apparatus disconnects with the second electronic apparatus, it may automatically delete the already-created application identifiers. Of course, it may also not delete the already-created application identifiers.

In addition, when the electronic apparatus disconnects with the second electronic apparatus, the list of applications may disassociate the applications in the list of applications and files of corresponding file types in the first storage unit and/or the second storage unit. Of course, it may not disassociate.

In addition, an update requesting unit may be provided on the first electronic apparatus, such as a hardware unit like a key, a button etc., or a software unit corresponding to a predetermined command like an icon, a shortcut etc.

When the user operates on the update request unit, in this case, if the data connection of the first electronic apparatus and the second electronic apparatus is in a successful connection state, then an update request is transmitted to the second electronic apparatus.

If the data connection of the first electronic apparatus and the second electronic apparatus is in an unsuccessful connection state, then the update request is recorded in a recording unit of the first electronic apparatus (such as a memory), and when the data connection of the first electronic apparatus with the second electronic apparatus is in a successful connection state, the update request recorded in the recording unit is read and transmitted to the second electronic apparatus.

After receiving the update request, if the second electronic apparatus detects updated applications existed in the local in response to the update request, then the list of applications including the updated applications as transmitted by the second electronic apparatus is received, applications in the list of applications with files of file types corresponding to the updated applications are associated and/or disassociated based on the received list of applications.

Accordingly, by providing an update unit on the first electronic apparatus, the user can manually start synchronization with the second electronic apparatus according to needs during using process, and associate the applications on the second electronic apparatus and the files in the storage unit according to a synchronization result.

Further, association relationship of the applications and the files may be stored in a system of the first electronic apparatus. For example, a log file may be used in the operating system of the first electronic apparatus to record the association relationship of the applications and the files.

Further, the association relationship of the applications and the files as stored in the system of the first electronic apparatus may be used through a switching operation by the user.

Figure 10:
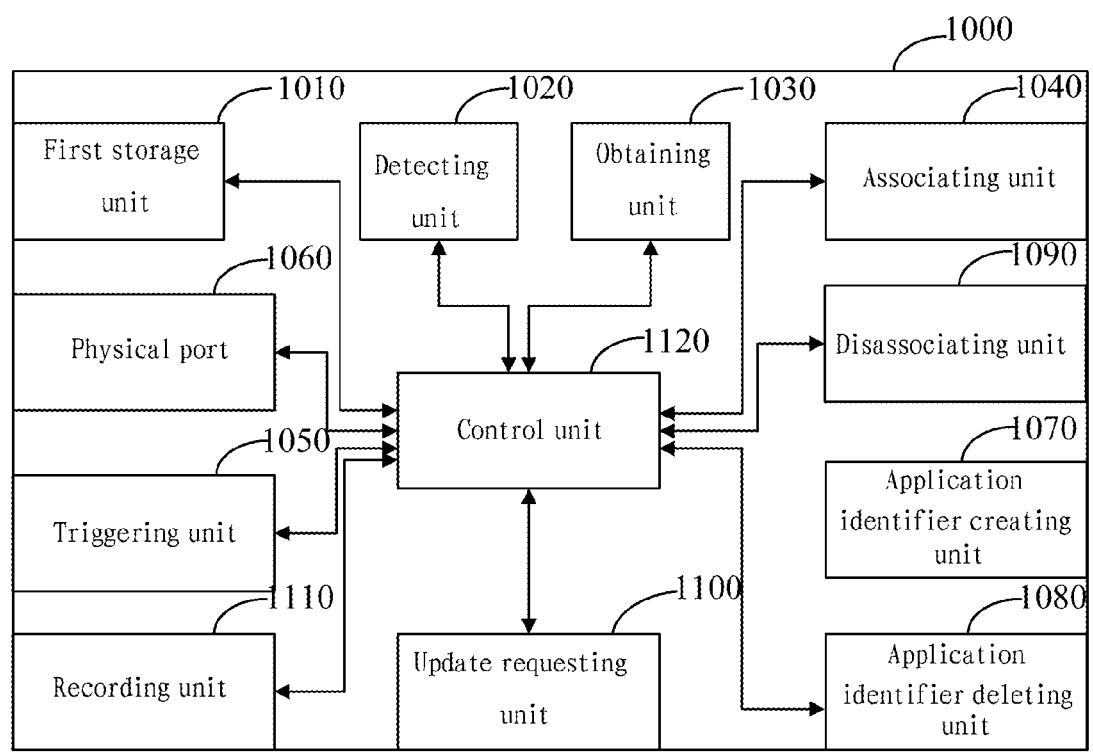
FIG. 10 is a block diagram illustrating the electronic apparatus according to an embodiment of the present disclosure.

Hereinafter, a block diagram illustrating the electronic apparatus 1000 according to an embodiment of the present application will be described with reference to FIG. 10.

The electronic apparatus 1000 according to this embodiment comprises:

a first storage unit 1010 configured for storing various user and files;

a detecting unit 1020 configured for obtaining a detection result;

an obtaining unit 1030 configured for, when the detection result satisfies a preset condition, obtaining a list of applications from the second electronic apparatus, the list of applications including at least one application installed in the second electronic apparatus, the second electronic apparatus including a second storage unit; and an associating unit 1040 configured for associating applications in the list of applications with files of corresponding file types in the first storage unit and/or the second storage unit according to the list of applications.

The preset condition includes:

the detection result indicates that the data connection of the first electronic apparatus with the second electronic apparatus succeeds; or the detection result indicates that the data connection of the first electronic apparatus with the second electronic apparatus succeeds, and also a requesting unit on the first electronic apparatus is operated, the requesting unit is a key provided on the first electronic apparatus or an identifier corresponding to a predetermined command, and is for transmitting to the second electronic apparatus a request for obtaining the list of applications.

The obtaining unit 1030 is further configured for:

when the detection result indicates that the data connection of the first electronic apparatus with the second electronic apparatus succeeds, transmitting to the second electronic apparatus a request for obtaining a list of applications installed in the second electronic apparatus, and thereafter receiving the list of applications transmitted by the second electronic apparatus in response to the request; or when the detection result indicates that the data connection of the first electronic apparatus with the second electronic apparatus succeeds, receiving the list of applications automatically transmitted by the second electronic apparatus.

The electronic apparatus 1000 may further comprise a triggering unit 1050 configured for starting wireless connection with the second electronic apparatus based on an operation executed by user on the triggering unit, wherein the triggering unit 1050 is a key provided on the electronic apparatus or an identifier corresponding to a predetermined command.

The electronic apparatus 1000 may further comprise a physical interface 1060 configured for, when physical connection with the second electronic apparatus is made through the physical interface 1060, starting the data connection with the second electronic apparatus.

The obtaining unit 1030 may be further configured for:

obtaining from the second electronic apparatus a list of applications including all of the applications in the second electronic apparatus; or obtaining from the second electronic apparatus a list of applications including specified applications in the second electronic apparatus; or obtaining from the second electronic apparatus a list of applications including updated applications, wherein the second electronic apparatus has already stored therein a list of applications previously transmitted; or transmitting to the second electronic apparatus a list of applications including applications to which already-existed application identifiers correspond, and obtaining from the second electronic apparatus a list of applications including updated applications, wherein the second electronic apparatus has not stored therein a list of applications previously transmitted.

The electronic apparatus 1000 may further comprise an application identifier creating unit 1070 configured for creating at least one application identifier corresponding to one application in the list of applications.

The electronic apparatus 1000 may further comprise an application identifier deleting unit 1080 configured for, when the first electronic apparatus disconnects with the second electronic apparatus, deleting the already-created application identifiers.

The electronic apparatus 1000 may further comprise a disassociating unit 1090 configured for, when the first electronic apparatus disconnects with the second electronic apparatus, disassociating applications in the list of applications with files of corresponding file types in the first storage unit and the second storage unit.

The electronic apparatus 1000 may further comprise an update requesting unit 1100, configured for, when a user operates on the update requesting unit, wherein the update requesting unit is a key provided on the electronic apparatus or an identifier corresponding to a predetermined command, if the data connection of the electronic apparatus 1000 with the second electronic apparatus succeeds, then transmitting to the second electronic apparatus an update request; and if the data connection of the electronic apparatus 1000 with the second electronic apparatus does not succeed, then recording in a recording unit 1110 of the first electronic apparatus the update request, and when the data connection of the first electronic apparatus with the second electronic apparatus succeeds, reading the update request recorded in the recording unit 1110 and transmitting it to the second electronic apparatus.

The application identifier creating unit 1070 and/or the application identifier deleting unit 1080 may be further configured for: if the second electronic apparatus detects updated applications in response to the update request, then receiving from the second electronic apparatus the list of applications including the updated applications, and creating and/or deleting the application identifiers corresponding to the updated applications according to the received list of applications Furthermore, association relationship of the applications and the files may be stored in a system of the first electronic apparatus 1000.

In addition, the association relationship of the applications and the files as stored in the system of the first electronic apparatus may be used through a switching operation by the user.

The first electronic apparatus may further comprise a control unit 1120 for integrally controlling respective units.

By means of the association method and the electronic apparatus according to an embodiment of the present disclosure, it is convenient to obtain the list of applications installed in another electronic apparatus, and associate applications in the list of applications with files of corresponding file types in the first storage unit and the second storage unit, thus conveniently selecting to open the files by using applications in the first electronic apparatus or in the second electronic apparatus, which improves user experience.

Figure 11:
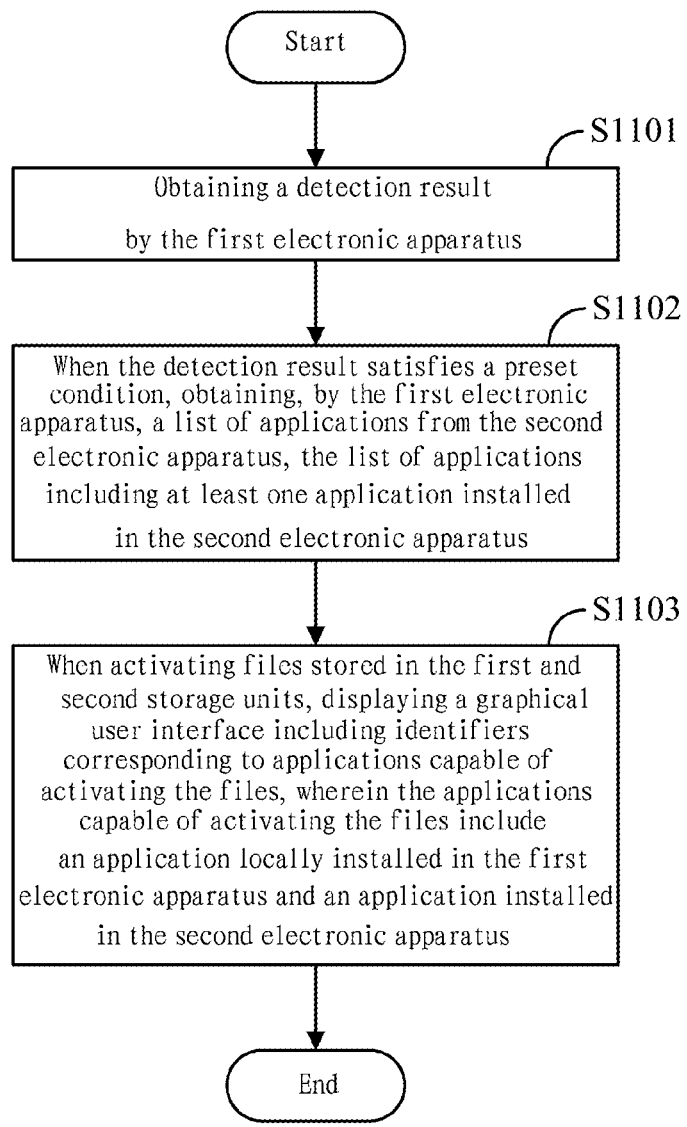
FIG. 11 is a flowchart illustrating the association method according to another embodiment of the present disclosure.

Next, the association method according to another embodiment of the present disclosure will be described with reference to FIG. 11.

Steps S1101 and S1102 in the association method according to another embodiment of the present disclosure are the same as steps S901 and S902 in the association method according to an embodiment of the present disclosure, detailed descriptions thereof are omitted herein.

Step 1103: When activating files stored in the first and second storage units, displaying a graphical user interface including identifiers corresponding to applications capable of activating the files, wherein the applications capable of activating the files include an application locally installed in the first electronic apparatus and an application installed in the second electronic apparatus.

In this step, when the user activates the files stored in the first storage unit and the second storage unit, a graphical user interface including identifiers corresponding to applications capable of activating the files, such as a pop-up menu, will be displayed. In this graphical user interface, identifiers of applications locally installed in the first electronic apparatus capable of activating the files and applications installed in the second electronic apparatus application and capable of activating the files identifier may be displayed, e.g., shortcuts, icons, or the like.

For example, when a movie file A.avi is stored in a storage unit of a host, after the host is connected to a PAD, when the user activates the movie file A.avi, a graphical user interface such as a pop-up menu can be displayed, and options of "Play with WindowPlayer at Host terminal", "Play with WindowPlayer at PAD terminal", "Play with MediaPlayer at PAD terminal" etc. are displayed in the pop-up menu, the user may, by selecting "Play with MediaPlayer at PAD terminal", automatically switch to the PAD and use the MediaPlayer on the PAD to play the movie file A.avi, thereby conveniently selecting an expected application activating file.

Figure 12:
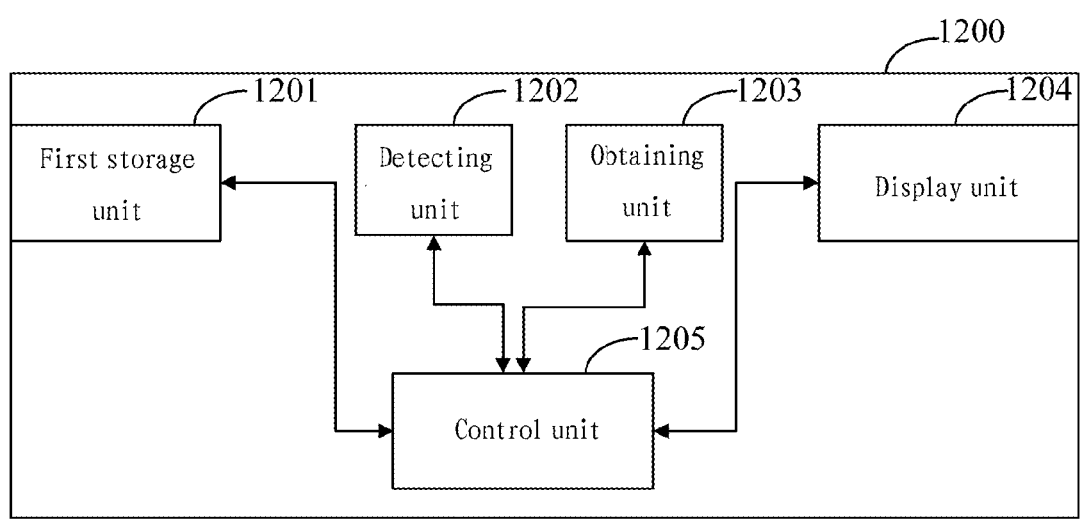
FIG. 12 is a block diagram illustrating the electronic apparatus according to another embodiment of the present disclosure.

Hereinafter, configuration of the electronic apparatus 1200 according to another embodiment of the present disclosure will be described with reference to FIG. 12.

The electronic apparatus 1200 according to this embodiment comprises:

a first storage unit 1201 configured for storing various user and files;

a detecting unit 1202 configured for obtaining a detection result;

an obtaining unit 1203 configured for, when the detection result satisfies a preset condition, obtaining a list of applications from the second electronic apparatus, the list of applications including at least one application installed in the second electronic apparatus, the second electronic apparatus including a second storage unit; and a display unit 1204 configured for, when activating files stored in the first and second storage units, displaying a graphical user interface including identifiers corresponding to applications capable of activating the files, wherein the applications capable of activating the files include applications locally installed in the first electronic apparatus and applications installed in the second electronic apparatus.

The preset condition may include:

the detection result indicates that the data connection of the first electronic apparatus with the second electronic apparatus succeeds; or the detection result indicates that the data connection of the first electronic apparatus with the second electronic apparatus succeeds, and also the requesting unit on the first electronic apparatus is operated, the requesting unit is a key provided on the first electronic apparatus or an identifier corresponding to a predetermined command, and is for transmitting to the second electronic apparatus a request for obtaining the list of applications.

The first electronic apparatus may comprise a control unit 1205 for integrally controlling respective units.

Further, the first electronic apparatus 1200 may further comprise functional units the same as other functional functions of the first electronic apparatus 1000 according to an embodiment, descriptions thereof are omitted herein.

By means of the association method and the electronic apparatus according to another embodiment of the present disclosure, it is convenient to obtain the list of applications installed in another electronic apparatus, and display a graphical user interface including identifiers corresponding to applications capable of activating the files, wherein the applications capable of activating the files include applications locally installed in the first electronic apparatus and applications installed in the second electronic apparatus, thus conveniently selecting to open the files by using applications in the first electronic apparatus or in the second electronic apparatus, which improves user experience.

Figure 13:
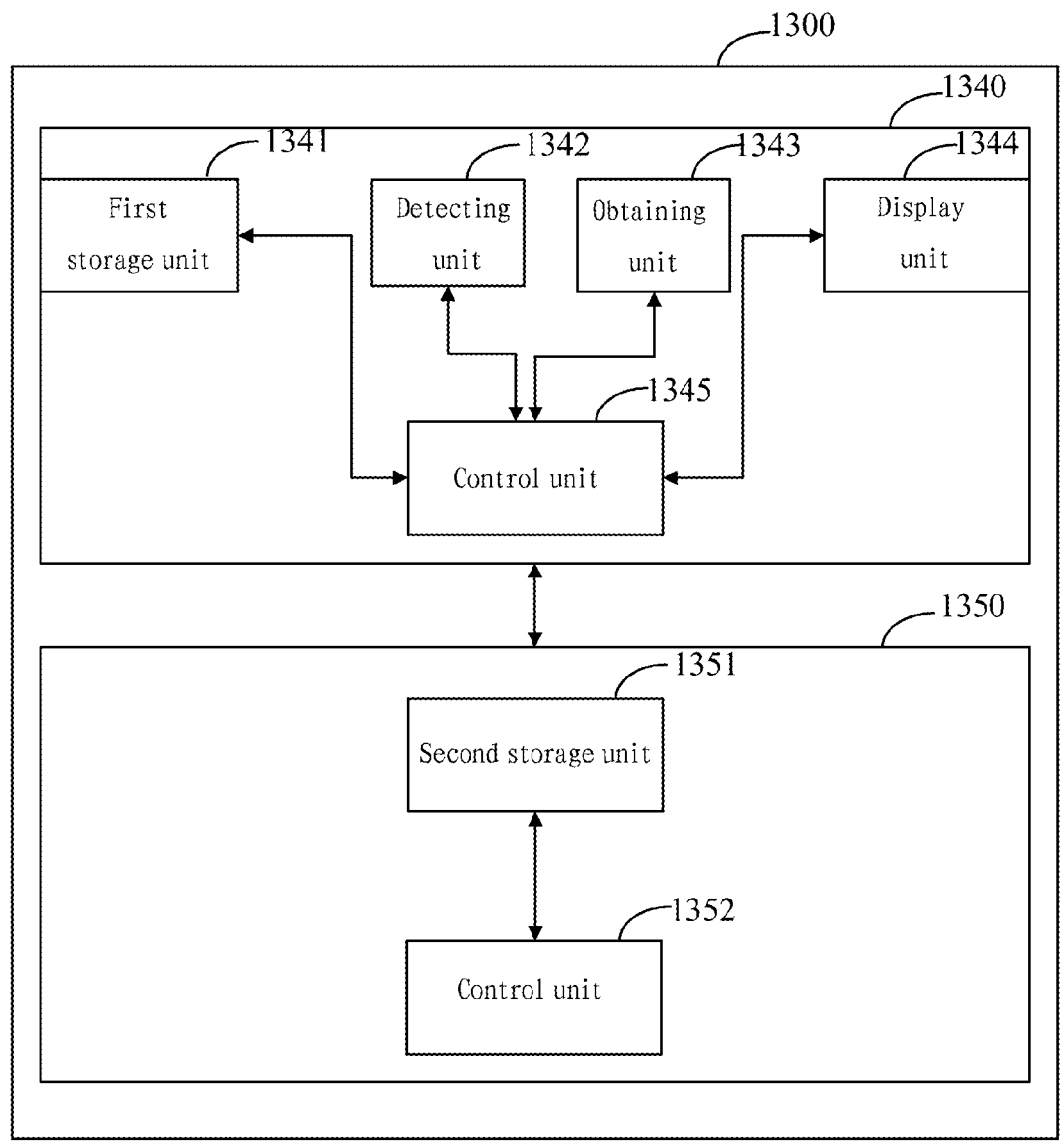
FIG. 13 is a block diagram illustrating a hybrid system according to an embodiment of the present disclosure.

Next, a hybrid system according to an embodiment of the present disclosure will be described with reference to FIG. 13.

The hybrid system 1300 according to an embodiment of the present disclosure comprises:

a first apparatus 1340 that includes a first hardware system having a first operating system and a second electronic apparatus 1350 that includes a second hardware system having a second operation system, wherein:

the second electronic apparatus 1350 includes:

a second storage unit 1351 configured for storing various user and files, the first electronic apparatus 1340 includes:

a first storage unit 1341 configured for storing various user and files;

a detecting unit 1342 configured for obtaining a detection result;

an obtaining unit 1343 configured for, when the detection result satisfies a preset condition, obtaining a list of applications from the second electronic apparatus 1350, the list of applications including at least one application installed in the second electronic apparatus 1350; and an associating unit 1344 configured for associating applications in the list of applications with files of corresponding file types in the first storage unit 1341 and/or the second storage unit 1351 according to the list of applications.

Similarly, the first electronic apparatus 1340 may include a control unit 1345 for controlling respective units. The second electronic apparatus 1350 may include a control unit 1352 for controlling respective units.

For example, the electronic apparatus 1340 may be a first electronic apparatus 1000 according to an embodiment.

By means of the hybrid system according to an embodiment of the present disclosure, it is convenient to obtain the list of applications installed in another electronic apparatus, and associate applications in the list of applications with files of corresponding file types in the first storage unit and in the second storage unit, thus conveniently selecting to open the files by using applications in the first electronic apparatus or the second electronic apparatus, which improves user experience.

Figure 14:
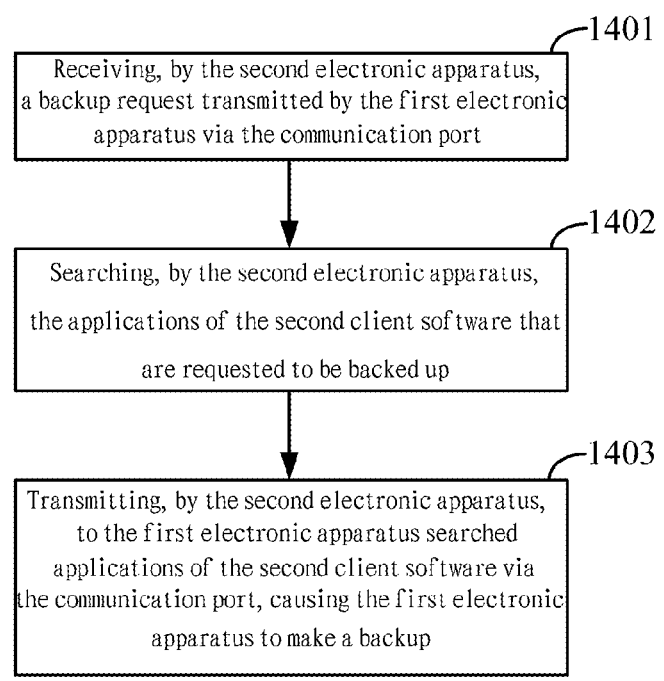
FIG. 14 is a flowchart of an application backup method according to an embodiment of the present disclosure.

FIG. 14 is a flowchart of an application backup method according to an embodiment of the present disclosure.

The application backup method may be applied to a system comprising at least a first electronic apparatus and a second electronic apparatus, e.g., a system formed by a BASE terminal (host device) and a PAD terminal (tablet computer), the two electronic apparatuses are connected via a certain communication port, to achieve communications therein between, for example, they connect and communicate via a Hybrid port. The first electronic apparatus is installed with a first client software and the second electronic apparatus is installed with a second client software, the two client software are not completely identical, at least applications contained therein are not completely identical. When certain applications on the second electronic apparatus need to be backed up on the first electronic apparatus, the backup method may comprise:

Step 1401, Receiving, by the second electronic apparatus, a backup request transmitted by the first electronic apparatus via the communication port.

First, the first electronic apparatus transmit to the second electronic apparatus a backup request via a communication port, the backup request includes information on applications of the second client software that are requested to be backed up, it may include information on one or more applications, and may include name, version number, etc. of the applications, as long as the application to be backed up can be marked.

This backup request may be triggered by the user by means of operating the first electronic apparatus, and a preset triggering condition may be set in advance in the first electronic apparatus, when state of running or storage etc. of the first electronic apparatus meets this triggering condition, the backup request transmitted to the second electronic apparatus is automatically triggered.

Step 1402, Searching, by the second electronic apparatus, the applications of the second client software that are requested to be backed up.

After receiving the backup result transmitted by the first electronic apparatus, the second electronic apparatus parses the request and obtains therefrom information on applications that need to be backed up, such as name, version number and other identifier information, thereafter search the needed applications in the second client software locally stored in the second electronic apparatus.

Specifically, a list of identifier information of all the applications of the second client software may be stored in advance in the second electronic apparatus, the second electronic apparatus first searches whether the applications needed by the first electronic apparatus exist in the list, if not, it feeds backs a search result to the first electronic apparatus, then ends the backup process; if so, it further extracts all information on the needed applications, such as installation procedures etc.

Step 1403, Transmitting, by the second electronic apparatus, to the first electronic apparatus searched applications of the second client software via the communication port, causing the first electronic apparatus to make a backup.

When the second electronic apparatus finds out information related to the applications needed by the first electronic apparatus, it transmits the same to the first electronic apparatus via the communication port, the first electronic apparatus makes a backup after receiving the same, specifically, installation and running may be started directly, or the received information may be only stored locally in the first electronic apparatus, and installation and running can be made at the time of using. If the first electronic apparatus also locally stores a list of identifier information of all of the applications of the first client software, this list may be updated simultaneously, and identifier information of the backed up applications may be added in this list.

In another embodiment, before step 1401 is executed, the first electronic apparatus and the second electronic apparatus may first transmit to the counterpart a list of identifier information of applications stored respectively therein, so that the two electronic apparatuses determine applications that may be backed up according to the list, and then transmit a backup request, so as to reduce a backup failure due to that a to-be-backed up application does not exist in the counterpart.

In the embodiments of the present disclosure, "first", "second" are termed relatively, not specifically or for defining, so long as it is a backup process between two electronic apparatuses, the above method can be implemented, and it all falls into the protection scope of the present disclosure.

The embodiment of the present disclosure enables two electronic apparatuses to communicate via a communication port, directly achieve backup of applications between different client software, without the need to install the entire client software, this method achieves backup of applications fast, simplifies operation process, and improves backup efficiency.

Figure 15:
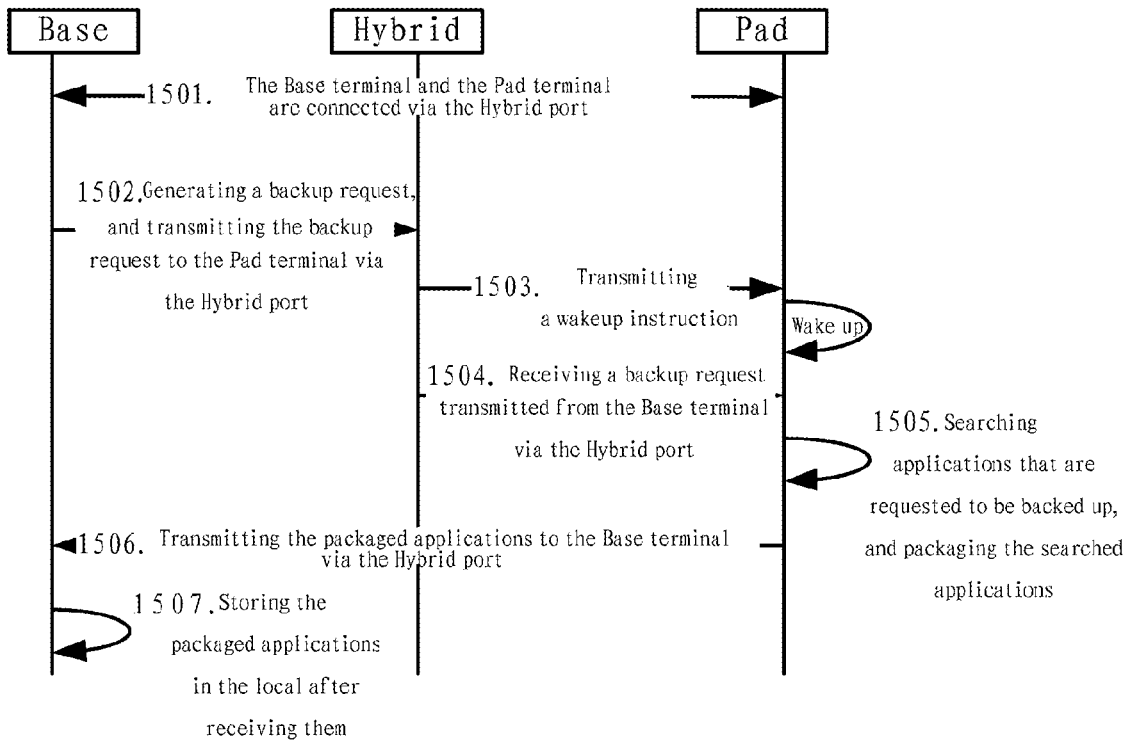
FIG. 15 is a flowchart of another application backup method according to an embodiment of the present disclosure.

Referring to FIG. 15, FIG. 15 is a flowchart of another application backup method according to an embodiment of the present disclosure.

In this embodiment, description is provided with the first electronic apparatus being a BASE terminal, the second electronic apparatus being a PAD terminal as example, the BASE terminal and the PAD terminal are connected and communicate via a Hybrid port. The BASE terminal is installed with first client software, and the PAD terminal is installed with second client software, applications in the two client software not completely identical. When the BASE terminal needs to back up certain applications on the PAD terminal, the backup method may comprise:

Step 1501, Connecting the BASE terminal and the PAD terminal via the Hybrid port.

Step 1502, Generating a backup request, and transmitting the backup request to the PAD terminal via the Hybrid port, by the BASE terminal.

When the BASE terminal detects the connection with the PAD terminal via the Hybrid part, it may trigger to generate a desktop shortcut on the desktop of the BASE terminal, this shortcut includes a backup function item, to facilitate triggering application backup. When the BASE terminal receives a backup command triggered by that the user operates on the backup function item in the desktop shortcut, it generates a backup request and transmits to the PAD terminal the backup request via the communication port, wherein the backup request includes therein identifier information on applications of the second client software as requested to be backed up. Said identifier information on applications may be a backup directory preset by the user at the BASE terminal.

The above process is not limited to backup between the BASE terminal and the PAD terminal, and may also be applied to backup between any other two electronic apparatuses that can communicate.

Step 1503, When the PAD terminal in a dormant state, transmitting a wakeup instruction by the Hybrid port, to wake up the PAD terminal.

In this embodiment, if the PAD terminal is in a dormant state, the Hybrid port needs to first execute a wakeup operation on the PAD terminal, specifically, the Hybrid port transmits to the PAD terminal a wakeup command, after being waken up, the PAD terminal enters an operating state, thereafter the Hybrid terminal transmits to the PAD terminal the backup request from the BASE terminal.

Step 1504, Receiving a backup request transmitted from the BASE terminal via the Hybrid port, by the PAD terminal after being waken up.

Step 1505, Searching applications that are requested to be backed up, and packaging the searched applications, by the PAD terminal.

After the PAD terminal parses the backup request and obtains identifier information on applications of the applications that need to be backed up therefrom, it searches related information of the needed applications, such as installation procedures, and thereafter packages all of the searched-out applications.

Step 1506, Transmitting, by the PAD terminal, the packaged applications to the BASE terminal via the Hybrid port.

Step 1507, Storing, by the BASE terminal, the packaged applications in the local after receiving them.

In another embodiment, if it is the PAD terminal that needs to back up the applications at the BASE terminal, similar process flows can be executed to make a backup.

The application backup method in this embodiment enables two electronic apparatuses to communicate via a communication port, directly achieve backup of applications between different client software, without the need to install the entire client software, this method achieves backup of applications fast, simplifies operation process, and improves backup efficiency.

The above are descriptions of method embodiments of the present disclosure, hereinafter, a system to implement to the above method will be introduced.

Figure 16:
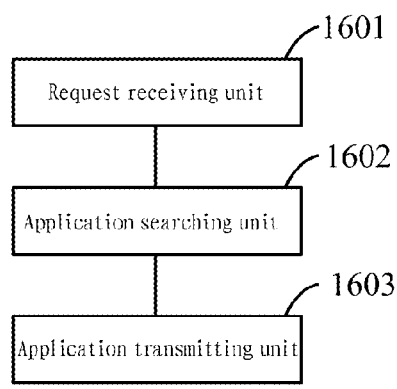
FIG. 16 is a schematic diagram of structure of an electronic apparatus according to an embodiment of the present disclosure.

Referring to FIG. 16, FIG. 16 is a schematic diagram of structure of an electronic apparatus according to an embodiment of the present disclosure.

The electronic apparatus is installed with client software and is connected with another electronic apparatus via a communication port, the another electronic apparatus is installed with another client software.

The electronic apparatus may comprise:

a request receiving unit 1601 for receiving a backup request transmitted by the another/first electronic apparatus via the communication port, the backup request including information on applications of client software in the electronic apparatus that are requested to be backed up;

an application searching unit 1602 for searching the applications of client software in the electronic apparatus that are requested to be backed up;

an application transmitting unit 1603 for transmitting to the another/first electronic apparatus searched-out applications via the communication port, causing the another/first electronic apparatus to make a backup.

The request receiving unit 1601 of the electronic apparatus receives a backup request transmitted by the another electronic apparatus via the communication port, the backup request includes information on applications of the client software in the electronic apparatus that are requested to be backed up, it may include information on one or more applications, and may include name, version number, etc. of the applications, as long as the application to be backed up can be marked. After receiving the backup request transmitted by the another electronic apparatus, the application searching unit 1602 obtains therefrom information on applications that need to be backed up, such as name, version number and other identifier information, thereafter search the needed applications in the client software locally stored. After finding relative information on applications needed by the another electronic apparatus, the application transmitting unit 1603 transmits to the another electronic apparatus the find applications.

In another embodiment, if the electronic apparatus is in a dormant state after receiving a first backup request transmitted by the another electronic apparatus via the communication port, the electronic apparatus may further comprise a state switching unit for entering an operating state according to a wakeup command transmitted by the communication port.

In the embodiment of the present disclosure, the electronic apparatus, by means of the above units, directly achieves backup of applications between different client software, without the need to install the entire client software on the other electronic apparatus, this method achieves backup of applications fast, simplifies operation process, and improves backup efficiency.

Figure 17:
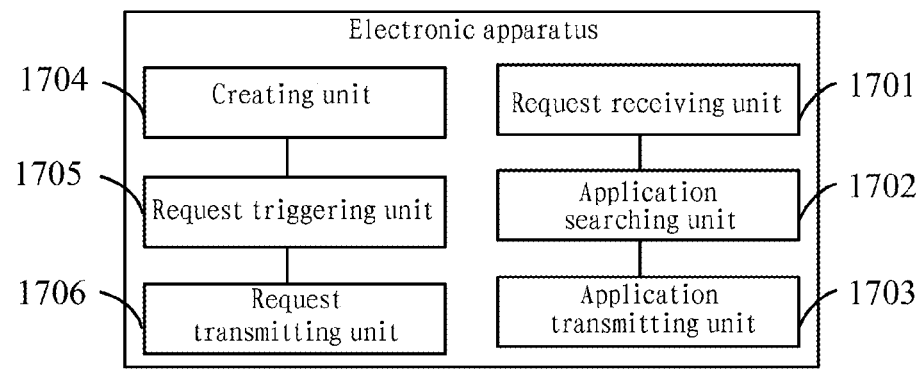
FIG. 17 is a schematic diagram of structure of another electronic apparatus according to an embodiment of the present disclosure.

Referring to FIG. 17, FIG. 17 is a schematic diagram of structure of another electronic apparatus according to an embodiment of the present disclosure.

In this embodiment, in addition to including the request receiving unit 1701, the application searching unit 1702, and the application transmitting unit 1703 to receive the first backup request from another electronic apparatus and back up applications to the another electronic apparatus, the electronic apparatus may further comprise the following units to transmit to the another electronic apparatus a second backup request, to obtain a backup of applications on the another electronic apparatus:

a creating unit 1704 for, when detecting the connection with the another electronic apparatus via the communication port, creating a desktop shortcut including a backup function item;

a request triggering unit 1705 for receiving a backup instruction triggered by that the user operates on the backup function item, to generate a backup request;

a request transmitting unit 1706 for transmitting to the another electronic apparatus the backup instruction via the communication port.

In the embodiment of the present disclosure, the electronic apparatus, by means of the above units, directly achieves backup of applications between different client software, without the need to install the entire client software on the other electronic apparatus, this method achieves backup of applications fast, simplifies operation process, and improves backup efficiency.

In the above embodiment, the electronic apparatus may be a BASE terminal or a PAD terminal in particular.

Figure 18:
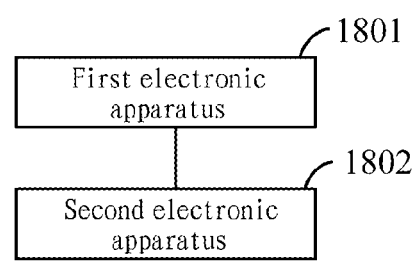
FIG. 18 is a schematic diagram of structure of an application backup system according to an embodiment of the present disclosure.

Referring to FIG. 18, FIG. 18 is a schematic diagram of structure of an application backup system according to an embodiment of the present disclosure.

The system may include a first electronic apparatus 1801 installed with first client software and a second electronic apparatus 1802 installed with second client software, the first electronic apparatus 1801 and the second electronic apparatus 1802 are connected via a communication port.

The second electronic apparatus 1802 is for receiving a backup request transmitted by the first electronic apparatus via the communication port, the backup request including information on applications of the second client software as requested to be backed up; searching applications of the second client software as requested to be backed up; and transmitting to the first electronic apparatus 1801 the searched-out applications of the second client software via the communication port, causing the first electronic apparatus to make a backup.

In another example, the first electronic apparatus 1801 may be specifically for, when detecting the connection with the second electronic apparatus 1802 via the communication port, generating a desktop shortcut including a backup function item; receiving a backup command triggered by that the user operates on the backup function item, to generate a backup request; and transmitting to the second electronic apparatus 1802 the backup request via the communications port.

The second electronic apparatus 1802 may further be for entering an operating state according to a wakeup command transmitted the communication port.

In this embodiment, the first electronic apparatus may be a BASE terminal, the second electronic apparatus may be a PAD terminal; or alternatively, the first electronic apparatus may be a PAD terminal, the second electronic apparatus may be a BASE terminal. The communication port may be a Hybrid port.

Further, according to another embodiment of the present disclosure, there is provided an operation method applied to a first electronic apparatus and a second electronic apparatus, said second electronic apparatus having a display screen, the method comprising: when detecting a connection of the first electronic apparatus with the second electronic apparatus, generating a first message indicating the connection and transmitting to the first electronic apparatus the first message indicating the connection; after receiving the first message, setting attribute of a pre-installed application to be installable in a system interface with respect to the first electronic apparatus; after receiving from the user a first operation command of installing the application, transmitting to the second electronic apparatus the application and a second command indicating installation of the application; after receiving the second message, generating on the display screen of the second electronic apparatus an identifier of the application, and setting attribute of the identifier of the application to be executable and uninstallable.

By means of the operation method described above, the user can install applications applied to the second electronic apparatus in the system interface of the first electronic apparatus, and after the application is installed, it is possible to run and uninstall the application in the system interface of the first electronic apparatus, thereby improving user convenience.

Figure 19:
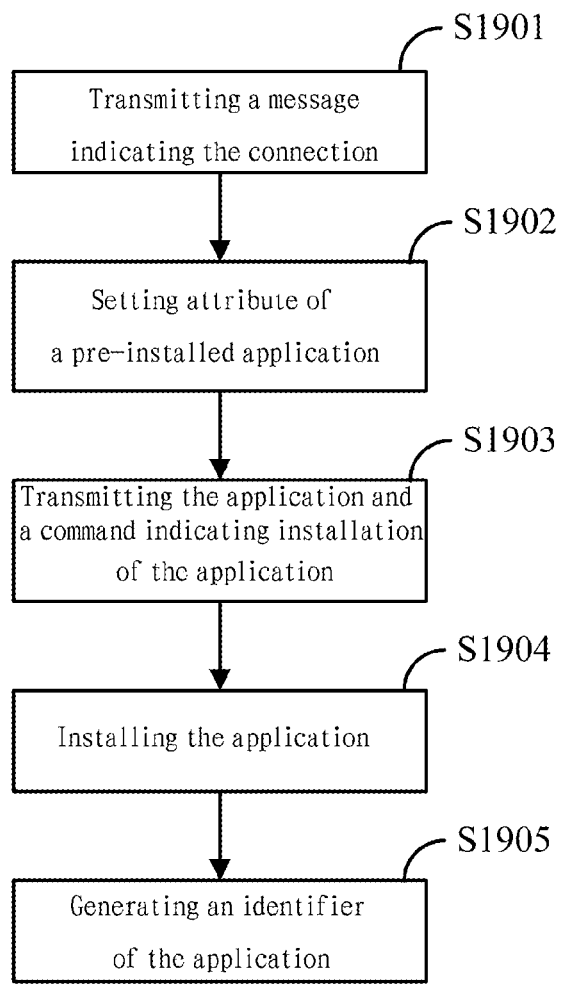
FIG. 19 is a schematic flowchart illustrating an operation method according to an embodiment of the present disclosure.

FIG. 19 is a schematic flowchart illustrating an operation method according to an embodiment of the present disclosure. As shown in FIG. 19, the operation method according to an embodiment of the present disclosure is applied to a first electronic apparatus and a second electronic apparatus, the second electronic apparatus having a display screen, the method comprising: S1901, when detecting that the first electronic apparatus is connected with the second electronic apparatus, transmitting to the first electronic apparatus a first message indicating the connection; S1902, after receiving the first message, setting, by the first electronic apparatus, attribute of a pre-installed application to be installable in a system interface with respect to the first electronic apparatus; S1903, after receiving from the user a first operation command of installing the application, transmitting, by the first electronic apparatus, to the second electronic apparatus the application and a second command indicating installation of the application; S1904, after receiving the second command and the application, installing the application and transmitting to the first electronic apparatus a second message including information for generating an identifier of the application, by second electronic apparatus; S1905, after receiving the second message, generating an identifier of the application on the display screen of the second electronic apparatus, and setting attribute of the identifier of the application to be executable and uninstallable, by the first electronic apparatus.

As mentioned the above, in the conventional hybrid system, when aiming to install the application to the second electronic apparatus in the system interface of the first electronic apparatus, first it needs to copy a downloaded application package of the second electronic apparatus to a shared storage area, and manually switch to the terminal of the second electronic apparatus, thereafter the application is searched in the file browser and installed, the user's operations are very cumbersome. In addition, if certain tools, like Peek.pe mobile assistant, or auxiliary tools such as iTunes are applied at the terminal of the first electronic apparatus to install the application, then the aforesaid auxiliary tools need to be started to install the corresponding application, in this process, extra process of connecting with the second electronic apparatus and paring etc. are further needed, so it may need to install apparatus drivers, and perform the pairing process that is relatively time-consuming. As for this situation, in addition to additionally install such auxiliary tools, since attribute of files of the to-be-installed application on the interface of the first electronic apparatus is uninstallable, and attribute of icon of the already-installed application in interface of the first electronic apparatus also is unexecutable and uninstallable, when the user needs to install, run or uninstall, he/she all needs to open the interface of such auxiliary tools and perform corresponding operations, which brings inconvenience to the user.

In embodiments of the present disclosure, application package of the to-be-installed application is installable in the system interface, for example, the user may directly double-click the application package to install, or right-click the application package, then menu of the right key will show an option to install the application package. When operating the first electronic apparatus, if the application package is not on the desktop of the operating system of the first electronic apparatus, the user may needs to use the file browser to find the application package and install, however, different than the prior art, the user does not need to use special auxiliary tools to install the application package. Also, after the application is installed in the second electronic apparatus, the second electronic apparatus will synchronize the icon of the application to the first electronic apparatus. Specifically, since the first electronic apparatus uses the display screen of the second apparatus as its own display screen after connecting with the second electronic apparatus, what is displayed on the display screen of the second electronic apparatus actually is a display interface of the operating system of the first electronic apparatus. After installation of the application is completed on the second electronic apparatus, it is impossible for the first electronic apparatus to view the user interface of the application on its own operating system, for the sake of enabling the user to view the application on the first electronic apparatus, the icon of the application needs to be synchronized to the first electronic apparatus. In the conventional auxiliary tools mentioned above, the icon of the already-installed application in the second electronic apparatus will also synchronized to the terminal of the first electronic apparatus, and the user can view and operate through said auxiliary tools. However, in the embodiment of the present disclosure, as described above, after the application is installed in the second electronic apparatus, and the message including information for generating the icon of the application is transmitted to the first electronic apparatus, the first electronic apparatus directly generates the icon of the application on the display screen of the second apparatus, and sets attribute of the icon of the application as executable and uninstallable in the system interface. In this way, the user may not need special auxiliary tools, and can view the application directly in the system interface of the operating system of the first electronic apparatus, and executes operations of running or uninstalling the application directly on the system interface, which can significantly improve using convenience of the user.

The above operation method further comprise: when receiving from the user a third command of uninstalling the application, transmitting, by the first electronic apparatus, to the second electronic apparatus a fourth command of uninstalling the application; after receiving the fourth command, uninstalling the application and transmitting to the first electronic apparatus a third message indicating that the application has already be uninstalled, by the second electronic apparatus; after receiving the third message, deleting, by the first electronic apparatus, the icon of the application on the display screen of the second electronic apparatus display.

As described above, in the embodiment of the present disclosure, the user can uninstall the application installed in the second electronic apparatus in the system interface of the operating system of the first electronic apparatus, in this case, the first electronic apparatus and the second electronic apparatus can automatically execute installation of the application in the second electronic apparatus and the deletion of the icon of the application on the interface of the operating system, what is displayed on the display screen of the second electronic apparatus actually is the interface of the operating system of the first electronic apparatus, thus, after the icon of the application is deleted from the interface of the first electronic apparatus, naturally, the user will not see the icon of the application on the display screen of the second electronic apparatus.

In the above operation method, the first electronic apparatus and the second electronic apparatus adopt different operating systems. For example, as described above, the first electronic apparatus may be Windows operating system, and the second electronic apparatus may be Android operating system, of course, as appreciated by those skilled in the art, the first electronic apparatus and the second electronic apparatus may also adopt other operating system, embodiments of the present disclosure are not intended to limit in any regard.

In the above operation method, the first electronic apparatus sets attribute of the application as installable in the system interface and sets attribute of the icon of the application as executable and uninstallable in the system interface, by modifying a registry of the operating system of the first electronic apparatus.

In the embodiment of the present disclosure, instead of using special auxiliary tools to install the application package, and run and uninstall the application, the user can directly perform the above operations on the system interface of the operating system of the first electronic apparatus. Herein, the first electronic apparatus can set attribute of the application as installable in the system and set attribute of the icon of the application as executable and uninstallable in the system interface, by modifying a registry of the operating system of the first electronic apparatus. Of course, as will be appreciated by those skilled in the art, the first electronic apparatus may also adopt other ways to accomplish these functions, embodiments of the present disclosure are not intended to limit in this regard.

In the above operation method, the first electronic apparatus and the second electronic apparatus communicate via a hybrid connection. Herein, in the conventional hybrid system technique, usually the manner of Hybrid Connection is adopted for the first electronic apparatus and the second electronic apparatus to communicate, therefore, in the embodiment of the present disclosure, delivery of command and data between the first electronic apparatus and the second electronic apparatus is also made via the aforesaid manner of Hybrid Connection.

In the above operation method, transmitting to the second electronic apparatus the application and a second command indicating installation of the application specifically is: transmitting the application to a cache area of the second electronic apparatus.

In the embodiment of the present disclosure, when the application is transmitted to the second electronic apparatus, the second electronic apparatus needs to store the application, and then install the application therein, thus the second electronic apparatus needs to set an area to store the application in advance. Of course, as will be appreciated by those skilled in the art, the application is stored in a cache area of the second electronic apparatus, for the cache area typically has a faster access speed, so that the speed that the electronic apparatus installs the application can be improved relatively, which improves user convenience. However, if based on other considerations, such as the application that needs to be installed has a large package etc., the application may also be stored in other storage areas of the second electronic apparatus, e.g. a hard disk.

As described above, by means of the above operation method according to the embodiment of the present disclosure, it is possible to achieve installation, running, and uninstallation of the application that needs to installed in the second electronic apparatus directly on the interface of the operating system of the first electronic apparatus and, in the operation method according to the embodiment of the present disclosure, the above process is totally achieved by the first electronic apparels and the second electronic apparatus in background via their mutual communication, the user will not feel the above-described communication process. Of course, for the user to be clearly aware of the installation process of the application, the first electronic apparatus may also display on the interface of its operating system a message indicating the above progress, to facilitate user learn the installation progress of the application. Herein, in the process of the above operation method, the most time-consuming ones mainly are two parts, namely, transmitting the application to the second electronic apparatus and installing the application in the second electronic apparatus, the first electronic apparatus may integrally display the two processes as progress of installing the application in the interface of the operating system, or may also separately display them. And, as will be appreciated by those skilled in the art, when the first electronic apparatus needs to show progress of installing the application and the second electronic apparatus is installing the application, it needs to delivery to the first electronic apparatus the message on installation progress of the application, e.g., this may also be performed by the manner of Hybrid Connection between the first electronic apparatus and the second electronic apparatus.

According to another aspect of the embodiment of the present disclosure, there is provided an electronic apparatus capable of connecting with another electronic apparatus having a display screen, the electronic apparatus comprising: an embedded controller for, when detecting a connection with the another/second electronic apparatus, generating a first message indicating the connection and transmitting to the another/first electronic apparatus the first message indicating the connection; a controller configured for, after receiving the first message, setting attribute of a pre-installed application to be installable in a system interface with respect to the first electronic apparatus; after receiving from the user a first operation command of installing the application, transmitting to the another/second electronic apparatus the application and a second command indicating installation of the application; after receiving the second message, generating on the display screen of the another/second electronic apparatus an identifier of the application, and setting attribute of the identifier of the application to be executable and uninstallable.

Figure 20:
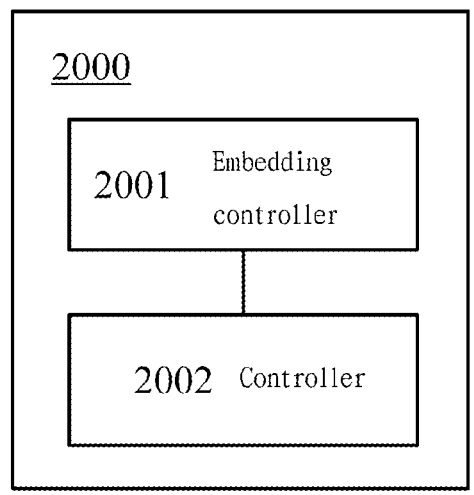
FIG. 20 is a schematic block diagram illustrating an electronic apparatus according to an embodiment of the present disclosure.

FIG. 20 is a schematic block diagram illustrating an electronic apparatus according to an embodiment of the present disclosure. As shown in FIG. 20, the electronic apparatus 2000 is capable of connecting with another electronic apparatus having a display screen, the electronic apparatus 2000 comprising: an embedded controller 2001 for, when detecting a connection with the another/second electronic apparatus, generating a first message indicating the connection and transmitting to the another/first electronic apparatus the first message indicating the connection; a controller 2002 configured for, after receiving the first message, setting attribute of a pre-installed application to be installable in a system interface with respect to the electronic apparatus 2000; after receiving from the user a first operation command of installing the application, transmitting to the another electronic apparatus the application and a second command indicating installation of the application; after receiving the second message, generating on the display screen of the another/second electronic apparatus an identifier of the application, and setting attribute of the identifier of the application to be executable and uninstallable.

Herein, as will be appreciated by those skilled in the art, the electronic apparatus 2000 is a host terminal in the hybrid system, i.e., BASE terminal, when using the hybrid system, the user actually achieves the above functions by operating the electronic apparatus 2000.

Further, in the conventional hybrid system, when the first electronic apparatus and the second electronic apparatus are connected, usually it is the embedded controller of the first electronic apparatus that detects the connection of the first electronic apparatus and the second electronic apparatus. However, as will be appreciated by those skilled in the art, the embodiment of the present disclosure is not limited thereto, and in other cases, probably, it may also be other controllers of the first electronic apparatus or a controller of the second electronic apparatus to detect the connection of the first electronic apparatus and the second electronic apparatus.

According to another aspect of the embodiment of the present disclosure, there is provided an electronic apparatus having a display screen and capable of being connected with another electronic apparatus, said electronic apparatus comprising: a controller for receiving from an embedded controller of the another electronic apparatus a first message indicating a connection with the another electronic apparatus; receiving from the another electronic apparatus an application and a second command indicating installment of the application, wherein attribute of the application is set installable in a system interface with respect to the another/first electronic apparatus; after receiving the second command and the application, installing the application and transmitting to the another/first electronic apparatus a second message including information for generating an identifier of the application; wherein after receiving the second message, the another first electronic apparatus generates on the display screen of the second electronic apparatus an identifier of the application, and sets attribute of the identifier of the application to be executable and uninstallable.

Figure 21:
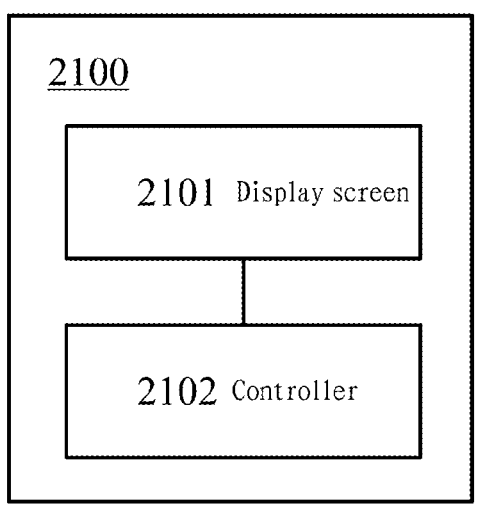
FIG. 21 is a schematic block diagram illustrating another electronic apparatus according to an embodiment of the present disclosure.

FIG. 21 is a schematic block diagram illustrating another electronic apparatus according to an embodiment of the present disclosure. As shown in FIG. 21, the electronic apparatus 2100 has a display screen 2101 and is capable of being connected with another electronic apparatus, said electronic apparatus 2100 comprising: a controller 2102 for receiving from an embedded controller of the another electronic apparatus a first message indicating a connection with the another electronic apparatus; receiving from the another electronic apparatus an application and a second command indicating installment of the application, wherein attribute of the application is set installable in a system interface with respect to the another/first electronic apparatus; after receiving the second command and the application, installing the application and transmitting to the another/first electronic apparatus a second message including information for generating an identifier of the application; wherein after receiving the second message, the another first electronic apparatus generates on the display screen of the second electronic apparatus an identifier of the application, and sets attribute of the identifier of the application to be executable and uninstallable.

Also, as will be appreciated by those skilled in the art, the above electronic apparatus 2100 is a tablet computer terminal in the hybrid system, i.e., the PAD terminal, when the user is using the hybrid system, the BASE terminal uses the display screen at the PAD terminal as the display of the hybrid system to display, thus what is displayed on the display screen 2101 of the electronic apparatus 2100 actually is the interface of the operating system at the BASE terminal.

With the first electronic apparatus being BASE, and the second electronic apparatus being PAD as example, a specific example of the operation method according to the embodiment of the present disclosure will be described below.

When the PAD terminal is plugged with the BASE terminal, the embedded controller transmits an attach message, when the AppInstallService at the BASE terminal obtains the message that the PAD terminal is plugged, it, by way of modifying the registry of the operating system, automatically adds an option of "Install to PAD terminal" in the right-key menu of File Type of the PAD program (such has the installation program of the Android system is apk file), and sets it as a default opening mode. After the user double-clicks the PAD program package, AppInstallService transmits to the PAD terminal a command of installing the application, and simultaneously transmits the entire program package to the cache area at the PAD terminal in the form of data stream via Hybrid Connection. After the PAD terminal receives the command and the program package, it automatically installs the program package, and transmits to the BASE terminal information the name of the applications, the name of the package, and icons etc. in the XML format via Hybrid Connection. The AppInstallService at the BASE terminal will generate a shortcut icon of the above PAD program, and add an option of "Delete program at PAD terminal" in the right-key menu of the icon. When the user needs to delete the application, the user selects the option of "Delete program at PAD terminal" in the right-key menu of the icon, the AppInstallService transmits to the PAD terminal a command of deleting the program via Hybrid Connection. The PAD terminal automatically deletes the corresponding program package after receiving the command, and responds with a message via the Hybrid Connection. The BASE terminal automatically deletes the shortcut icon of the PAD program after receiving the response.

In the above operation method, the user does not need to install extra auxiliary tools, and does not needs to perform a connection paring between the BASE terminal and the PAD terminal, all data communications are implemented via Hybrid Connection, and does not need to manually switch to install and uninstall program at the PAD terminal, all the steps can be implemented at the BASE terminal. In addition, after the program installation at the PAD terminal is completed, the corresponding program icon is automatically synchronized at the BASE terminal, which facilitates the user running and uninstalling.

By means of the operation method and the electronic apparatus according to the embodiments of the present disclosure, installment, running, and uninstallment of an application that needs to be installed in the second electronic apparatus can be completed directly on the system interface of the operating system of the first electronic apparatus, thereby improving user convenience.

The respective solutions in the above embodiments of the present disclosure may be used independently or in combination.

It should be noted that, in the specification, terms "comprise", "include" and any other variations thereof intend to cover nonexclusive inclusion so that the procedure, the method, the product or the equipment including a series of elements include not only these elements, but also other elements not listed explicitly, or also inherent elements of these procedure, method, product or equipment. In a case that there is no more limitation, the element defined by statement "including one . . . " does not exclude there is an additional same element in the procedure, method, article or apparatus including the element.

Finally, it should be noted that, the above-described series of processing do not only comprise processing executed chronologically in the order mentioned herein, but also comprise processing executed in parallel or individually but not chronologically.

As will be clearly appreciated by those skilled in the art, the techniques in the embodiments of the present disclosure may be implemented by recurring to the manner of software plus necessary hardware platform. Based on such understanding, the technical solutions in the embodiments of the present disclosure can embody its substance or the parts that contribute over the prior art in the form of a software product, this computer program may be stored in storage medium, such as ROM/RAM, optical disk and so on, including several instructions to cause one computer device (which may be a personal computer, a server, or a network device and so on) to implement the respective embodiments or the method defined in certain parts of an embodiment.

Various embodiments in the specification are described in a progressive way, similar parts among the respective embodiments can be mutual consulted, and each embodiment emphasizes on its differences than the other. Especially, as for the system embodiments, since they are substantially similar to the method embodiments, descriptions thereof are relatively brief, please refer to the method parts for relevant descriptions.

The above-described implementations of the present disclosure do not constitute a limitation to the protection scope of the present disclosure, any modifications, equivalent replacements and improvements and so on made within the sprite and principle of the present disclosure should all be within the protection scope of the present application.

The invention claimed is:

1. An application management method applied to a first apparatus connected with a second apparatus, a first operating system is run on the first apparatus, the method comprising:

mapping at least one application in the second apparatus and obtaining at least one corresponding application identifier, wherein a second operating system is run on the second apparatus, the at least one application is installed in the second operating system;

detecting a first operation;

when the first operation satisfies a first preset condition, determining an application identifier for a first application from the at least one application identifier;

detecting a second operation, wherein the second operation is an operation executed on the preceding, determined application identifier of the first application;

when the second operation satisfies a second preset condition, obtaining a corresponding application manage command according to the second operation, and transmitting the application manage command to the second apparatus, so that the second apparatus manages the first application according to the application manage command and so that an application that is installed in the second electronic apparatus operates directly on a system interface of the operating system of the first electronic apparatus, wherein the application manage command comprises a command of switching a state, or a command of closing, starting, synchronizing, associating, backing up or installing an application.

2. The method according to claim 1, wherein mapping at least one application in the second apparatus comprises:

transmitting, by the first apparatus, to the second apparatus a request for obtaining applications that have already been running on the second apparatus;

receiving a list of applications returned by the second apparatus according to the request, the list of applications including application identifiers of applications that have already been running on the second apparatus;

or transmitting, by the first apparatus, to the second apparatus a request for obtaining applications that have not been running on the second apparatus;

receiving a list of applications returned by the second apparatus according to the request, the list of applications including application identifiers of applications that have not been running on the second apparatus.

3. The method according to claim 2, wherein the first apparatus includes a display unit such that in a first state of the first apparatus the display unit displays an operating state of the first operating system, and in a second state of the first apparatus the display unit displays an operating state of the second operating system.

4. The method according to claim 3, wherein when the first apparatus transmits to the second apparatus a request for obtaining applications that have already been running on the second apparatus, transmitting the application manage command to the second apparatus comprises:
when the first apparatus is in the first state, transmitting to the second apparatus a switch command of switching to the second state, so that the second apparatus executes the first application in the second state, or
when the first apparatus is in the first state, transmitting to the second apparatus a close command of closing the first application, so that the second apparatus ends progress of the first application, or
when the first apparatus is in the first state, transmitting to the second apparatus a start command of starting the first application.

5. The method according to claim 1, wherein mapping at least one application in the second apparatus comprises:
detecting data connection with the second electronic apparatus to obtain a detection result;
when the detection result indicates that the data connection of the first electronic apparatus with the second electronic apparatus succeeds, obtaining a list of applications from the second electronic apparatus, the list of applications including at least one application installed in the second electronic apparatus; and
creating at least one application identifier corresponding to one application in the list of applications according to the list of applications, wherein after the application identifier is triggered, the application corresponding to the application identifier can be started in the second electronic apparatus.

6. The method according to claim 5, wherein the first electronic apparatus includes a display unit, the method further comprising when the application corresponding to the at least one application identifier is started in the second electronic apparatus, displaying on the display unit a running interface of the second electronic apparatus.

7. The method according to claim 5, wherein obtaining a list of applications from the second electronic apparatus comprises:
when the detection result indicates that the data connection of the first electronic apparatus with the second electronic apparatus succeeds, transmitting a request to the second electronic apparatus for obtaining a list of applications installed in the second electronic apparatus, and thereafter receiving the list of applications transmitted by second electronic apparatus in response to the request; or
when the detection result indicates that the data connection of the first electronic apparatus with the second electronic apparatus succeeds, receiving the list of applications automatically transmitted by the second electronic apparatus.

8. The method according to claim 5, wherein obtaining a list of applications from the second electronic apparatus comprises:
obtaining from the second electronic apparatus a list of applications including all of the applications in the second electronic apparatus; or
obtaining from the second electronic apparatus a list of applications including specified applications in the second electronic apparatus; or
obtaining from the second electronic apparatus a list of applications including updated applications, wherein the second electronic apparatus has already stored therein a list of applications previously transmitted; or
transmitting to the second electronic apparatus a list of applications including applications to which already-existing application identifiers correspond, and obtaining from the second electronic apparatus a list of applications including updated applications, wherein the second electronic apparatus has not stored therein a list of applications previously transmitted.

9. The method according to claim 5, wherein creating at least one application identifier corresponding to one application in the list of applications according to the list of applications comprises:
in the case of deleting already-created application identifiers when the electronic apparatus disconnects with the second electronic apparatus, creating a plurality of application identifiers respectively corresponding to all of the applications in the list of applications; or
in the case of not deleting already-created application identifiers when the electronic apparatus disconnects with the second electronic apparatus, comparing all of the applications in the list of applications with the applications to which the already-existed application identifiers correspond, and creating and/or deleting application identifiers corresponding to updated applications based on a comparison result.

10. The method according to claim 5, further comprising:
when a user operates an update requesting unit on the first electronic apparatus, wherein the update requesting unit is a key provided on the first electronic apparatus or an identifier corresponding to a predetermined command,
if the data connection of the first electronic apparatus with the second electronic apparatus succeeds, then transmitting to the second electronic apparatus an update request; and
if the data connection of the first electronic apparatus with the second electronic apparatus does not succeed, then recording in a recording unit of the first electronic apparatus the update request, and when the data connection of the first electronic apparatus with the second electronic apparatus succeeds, reading the update request recorded in the recording unit and transmitting it to the second electronic apparatus.

11. The method according to claim 10, further comprising if the second electronic apparatus detects updated applications in response to the update request, then receiving from the second electronic apparatus the list of applications including the updated applications, and creating and/or deleting the application identifiers corresponding to the updated applications according to the received list of applications.

12. The method according to claim 5, further comprising associating, by the first electronic apparatus, applications in the list of applications with files of corresponding file types in the first storage unit and/or the second storage unit according to the list of applications.

13. The method according to claim 12, wherein the preset condition comprises:

the detection result indicates that the data connection of the first electronic apparatus with the second electronic apparatus succeeds; or the detection result indicates that the data connection of the first electronic apparatus with the second electronic apparatus succeeds, and also, a requesting unit on the first electronic apparatus is operated, the requesting unit is a key provided on the first electronic apparatus or an identifier corresponding to a predetermined command, and is for transmitting to the second electronic apparatus a request for obtaining the list of applications.

14. The association method according to claim 12, further comprising when the first electronic apparatus disconnects with the second electronic apparatus, disassociating applications in the list of applications with files of corresponding file types in the first storage unit and/or the second storage unit.

15. The method according to claim 12, wherein an association relationship of the applications and the files is stored in a system of the first electronic apparatus.

16. The method according to claim 15, wherein the association relationship of the applications and the files as stored in the system of the first electronic apparatus is used through a switching operation by a user.

17. The method according to claim 5, further comprising when activating files stored in first and second storage units, displaying a graphical user interface including identifiers corresponding to applications capable of activating the files, wherein the applications capable of activating the files include applications locally installed in the first electronic apparatus and applications installed in the second electronic apparatus.

18. The method according to claim 1, further comprising:
receiving, by the second electronic apparatus, a backup request transmitted by the first electronic apparatus via the communication port, the backup request including information on applications of the second client software that are requested to be backed up;
searching, by the second electronic apparatus, the applications of the second client software that are requested to be backed up;
transmitting, by the second electronic apparatus, to the first electronic apparatus searched-out applications of the second client software via the communication port, causing the first electronic apparatus to make a backup.

19. The method according to claim 18, wherein:
the application identifiers contain a backup function item;
prior to receiving, by the second electronic apparatus, a backup request transmitted by the first electronic apparatus via the communication port, the method further comprises:
receiving, by the first electronic apparatus, a backup instruction triggered by that the user operates on the backup function item, to generate a backup request;
transmitting, by the first electronic apparatus, to the second electronic apparatus the backup instruction via the communication port.

20. The method according to claim 1, wherein the second electronic apparatus has a display screen, the method further comprises:
when detecting that the first electronic apparatus is connected with the second electronic apparatus, transmitting to the first electronic apparatus a first message indicating the connection;
after receiving the first message, setting, by the first electronic apparatus, attribute of a pre-installed application to be installable in a system interface with respect to the first electronic apparatus;
after receiving from the user a first operation command of installing the application, transmitting, by the first electronic apparatus, to the second electronic apparatus the application and a second command indicating installation of the application;
after receiving the second command and the application, installing the application and transmitting to the first electronic apparatus a second message including information for generating an identifier of the application, by second electronic apparatus;
after receiving the second message, generating an identifier of the application on the display screen of the second electronic apparatus, and setting attribute of the identifier of the application to be executable and uninstallable, by the first electronic apparatus.

21. The method according to claim 20, further comprising:
when receiving from the user a third command of uninstalling the application, transmitting, by the first electronic apparatus, to the second electronic apparatus a fourth command of uninstalling the application;
after receiving the fourth command, uninstalling the application and transmitting to the first electronic apparatus a third message indicating that the application has already be uninstalled, by the second electronic apparatus;
after receiving the third message, deleting, by the first electronic apparatus, the icon of the application on the display screen of the second electronic apparatus display.

22. An application management apparatus, which, as a first apparatus, connects with a second apparatus, a first operating system is run on the first apparatus, the first apparatus comprising:
a mapping unit for mapping at least one application in the second apparatus and obtaining at least one corresponding application identifier, wherein a second operating system is run on the second apparatus, the at least one application is installed in the second operating system;
a first detecting unit for detecting a first operation;
a determining unit for, when the first operation satisfies a first preset condition, determining an application identifier for a first application from the at least one application identifier;
a second detecting unit for detecting a second operation, wherein the second operation is an operation executed on the preceding, determined application identifier of the first application;
a managing unit for, when the second operation satisfies a second preset condition, obtaining a corresponding application manage command according to the second operation, and transmitting the application manage command to the second apparatus, so that the second apparatus manages the first application according to the application manage command then an application that is installed in the second electronic apparatus operates directly on a system interface of the operating system of the first electronic apparatus, wherein the application manage command comprises a command of switching a state, or a command of closing, starting, synchronizing, associating, backing up or installing an application.

23. The apparatus according to claim 22, wherein the mapping unit comprises at least one of the following units:
a first mapping unit for transmitting to the second apparatus a request for obtaining applications that have already been running on the second apparatus, receiving a list of applications returned by the second apparatus according to the request, the list of applications including application identifiers of applications that have already been running on the second apparatus;

a second mapping unit for transmitting to the second apparatus a request for obtaining applications that have not been running on the second apparatus, receiving a list of applications returned by the second apparatus according to the request, the list of applications including application identifiers of applications that have not been running on the second apparatus.

24. The apparatus according to claim 23, wherein the first apparatus further comprises a display unit such that in a first state of the first apparatus the display unit displays an operating state of the first operating system, and in a second state of the first apparatus the display unit displays an operating state of the second operating system.

25. The apparatus according to claim 24, wherein the managing unit includes:

a switching managing unit for, when the first apparatus is in the first state and when the first mapping unit transmits to the second apparatus a request for obtaining applications that have already been running on the second apparatus, transmitting to the second apparatus a switch command of switching to the second state, so that the second apparatus executes the first application in the second state, or a closing managing unit for, when the first apparatus is in the first state and when the first mapping unit transmits to the second apparatus a request for obtaining applications that have already been running on the second apparatus, transmitting to the second apparatus a close command of closing the first application, so that the second apparatus ends progress of the first application, or a starting managing unit when the first apparatus is in the first state and when the first mapping unit transmits to the second apparatus a request for obtaining applications that have not been running on the second apparatus, transmitting to the second apparatus a start command of starting the first application.

26. The apparatus according to claim 22, further comprising:

a connection detecting unit configured for detecting data connection with the second electronic apparatus to obtain a detection result;

the mapping unit includes the following units:

an obtaining unit configured for, when the detection result indicates that the data connection of the first electronic apparatus with the second electronic apparatus succeeds, obtaining a list of applications from the second electronic apparatus, the list of applications including at least one application installed in the second electronic apparatus; and a creating unit configured for, creating at least one application identifier corresponding to one application in the list of applications according to the list of applications, wherein after the application identifier is triggered, the application corresponding to the application identifier can be started in the second electronic apparatus.

27. The apparatus according to claim 26, further comprising a display unit configured for, when the application corresponding to application identifier is started in the second electronic apparatus, displaying a running interface of the second electronic apparatus.

28. The apparatus according to claim 26, wherein the obtaining unit is further configured for:

obtaining from the second electronic apparatus a list of applications including all of the applications in the second electronic apparatus; or obtaining from the second electronic apparatus a list of applications including specified applications in the second electronic apparatus; or obtaining from the second electronic apparatus a list of applications including updated applications, wherein the second electronic apparatus has already stored therein a list of applications previously transmitted; or transmitting to the second electronic apparatus a list of applications including applications to which already-existed application identifiers correspond, and obtaining from the second electronic apparatus a list of applications including updated applications, wherein the second electronic apparatus has not stored therein a list of applications previously transmitted.

29. The apparatus according to claim 26, wherein the creating unit is further configured for:

in the case of deleting the already-created application identifiers when the first electronic apparatus disconnects with the second electronic apparatus, creating a plurality of application identifiers respectively corresponding to all of the applications in the list of applications; or in the case of not deleting the already-created application identifiers when the first electronic apparatus disconnects with the second electronic apparatus, comparing all of the applications in the list of applications with the applications to which the already-existed application identifiers correspond, and creating and/or deleting application identifiers corresponding to updated applications based on a comparison result.

30. The apparatus according to claim 29, wherein the creating unit is further configured for: if the second electronic apparatus detects updated applications in response to the update request, then receiving from the second electronic apparatus the list of applications including the updated applications, and creating and/or deleting the application identifiers corresponding to the updated applications according to the received list of applications.

31. The apparatus according to claim 26, wherein the second electronic apparatus includes a second storage unit, the apparatus further comprising:

a first storage unit configured for storing various users and files;

an associating unit configured for associating applications in the list of applications with files of corresponding file types in the first storage unit and/or the second storage unit according to the list of applications.

32. The apparatus according to claim 31, wherein the preset condition comprises:

the detection result indicates that the data connection of the first electronic apparatus with the second electronic apparatus succeeds; or the detection result indicates that the data connection of the first electronic apparatus with the second electronic apparatus succeeds, and also, a requesting unit on the first electronic apparatus is operated, the requesting unit is a key provided on the first electronic apparatus or an identifier corresponding to a predetermined command, and is for transmitting to the second electronic apparatus a request for obtaining the list of applications.

33. The apparatus according to claim 31, further comprising a disassociating unit configured for, when the first electronic apparatus disconnects with the second electronic apparatus, disassociating applications in the list of applications with files of corresponding file types in the first storage unit and the second storage unit.

34. The apparatus according to claim 31, wherein an association relationship of the applications and the files is stored in a system of the first electronic apparatus.

35. The apparatus according to claim 34, wherein the association relationship of the applications and the files as stored in the system of the first electronic apparatus is used through a switching operation by a user.

36. The apparatus according to claim 26, further comprising:
a display unit configured for, when activating files stored in the first and second storage units, displaying a graphical user interface including identifiers corresponding to applications capable of activating the files, wherein the applications capable of activating the files include applications locally installed in the first electronic apparatus and applications installed in the second electronic apparatus.

37. The apparatus according to claim 22, further comprising:
a request receiving unit for receiving a backup request transmitted by the another/first electronic apparatus via the communication port, the backup request including information on applications of client software in the electronic apparatus that are requested to be backed up;
an application searching unit for searching the applications of client software in the electronic apparatus that are requested to be backed up;
an application transmitting unit for transmitting to the another/first electronic apparatus searched-out applications via the communication port, causing the another/first electronic apparatus to make a backup.

38. The apparatus according to claim 37, wherein: the application identifiers contain a backup function item; the electronic apparatus further comprises:
a request triggering unit for receiving a backup instruction triggered by that the user operates on the backup function item, to generate a backup request;
a request transmitting unit for transmitting to the another/second electronic apparatus the backup instruction via the communication port.

39. The application management apparatus according to claim 22, further comprising:
an embedded controller for, when detecting a connection with the another/second electronic apparatus, generating a first message indicating the connection and transmitting to the another/first electronic apparatus the first message indicating the connection;
a controller configured for, after receiving the first message, setting attribute of a pre-installed application to be installable in a system interface with respect to the first electronic apparatus;
after receiving from the user a first operation command of installing the application, transmitting to the another/second electronic apparatus the application and a second command indicating installation of the application;
after receiving the second message, generating on the display screen of the another/second electronic apparatus an identifier of the application, and setting attribute of the identifier of the application to be executable and uninstallable.

40. The application managing apparatus according to claim 22, further comprising:
a controller for receiving from an embedded controller of the another electronic apparatus a first message indicating a connection with the another electronic apparatus;
receiving from the another electronic apparatus an application and a second command indicating installment of the application, wherein attribute of the application is set installable in a system interface with respect to the another/first electronic apparatus;
after receiving the second command and the application, installing the application and transmitting to the another/first electronic apparatus a second message including information for generating an identifier of the application;
wherein after receiving the second message, the another first electronic apparatus generates on the display screen of the second electronic apparatus an identifier of the application, and sets attribute of the identifier of the application to be executable and uninstallable.

41. An application management method applied to a first apparatus connected with a second apparatus, wherein a first operating system is run on the first apparatus and the second electronic apparatus has a display screen, the method comprising:
mapping at least one application in the second apparatus and obtaining at least one corresponding application identifier, wherein a second operating system is run on the second apparatus, the at least one application is installed in the second operating system;
detecting a first operation;
when the first operation satisfies a first preset condition, determining an application identifier for a first application from the at least one application identifier;
detecting a second operation, wherein the second operation is an operation executed on the preceding, determined application identifier of the first application;
when the second operation satisfies a second preset condition, obtaining a corresponding application manage command according to the second operation, and transmitting the application manage command to the second apparatus, so that the second apparatus manages the first application according to the application manage command and so that an application installed in the second electronic apparatus operates directly on a system interface of the operating system of the first electronic apparatus;
when detecting that the first electronic apparatus is connected with the second electronic apparatus, transmitting to the first electronic apparatus a first message indicating the connection;
after receiving the first message, setting, by the first electronic apparatus, attribute of a pre-installed application to be installable in a system interface with respect to the first electronic apparatus;
after receiving from the user a first operation command of installing the application, transmitting, by the first electronic apparatus, to the second electronic apparatus the application and a second command indicating installation of the application;
after receiving the second command and the application, installing the application and transmitting to the first electronic apparatus a second message including information for generating an identifier of the application, by second electronic apparatus;

after receiving the second message, generating an identifier of the application on the display screen of the second electronic apparatus, and setting attribute of the identifier of the application to be executable and uninstallable, by the first electronic apparatus.

42. The method according to claim 41, further comprising:
when receiving from the user a third command of uninstalling the application, transmitting, by the first electronic apparatus, to the second electronic apparatus a fourth command of uninstalling the application;
after receiving the fourth command, uninstalling the application and transmitting to the first electronic apparatus a third message indicating that the application has already be uninstalled, by the second electronic apparatus;
after receiving the third message, deleting, by the first electronic apparatus, the icon of the application on the display screen of the second electronic apparatus display.

43. An application management apparatus, which, as a first apparatus, connects with a second apparatus, a first operating system is run on the first apparatus, the first apparatus comprising:
a mapping unit for mapping at least one application in the second apparatus and obtaining at least one corresponding application identifier, wherein a second operating system is run on the second apparatus, the at least one application is installed in the second operating system;
a first detecting unit for detecting a first operation;
a determining unit for, when the first operation satisfies a first preset condition, determining an application identifier for the a first application from the at least one application identifier;
a second detecting unit for detecting a second operation, wherein the second operation is an operation executed on the preceding, determined application identifier of the first application;
a managing unit for, when the second operation satisfies a second preset condition, obtaining a corresponding application manage command according to the second operation, and transmitting the application manage command to the second apparatus, so that the second apparatus manages the first application according to the application manage command then an application that is installed in the second electronic apparatus operates directly on a system interface of the operating system of the first electronic apparatus;
an embedded controller for, when detecting a connection with the second electronic apparatus, generating a first message indicating the connection and transmitting to the another/first electronic apparatus the first message indicating the connection;
a controller configured for, after receiving the first message, setting attribute of a pre-installed application to be installable in a system interface with respect to the first electronic apparatus;
after receiving from the user a first operation command of installing the application, transmitting to the another/second electronic apparatus the application and a second command indicating installation of the application;
after receiving the second message, generating on the display screen of the another/second electronic apparatus an identifier of the application, and setting attribute of the identifier of the application to be executable and uninstallable.

44. The application managing apparatus according to claim 43, further comprising:
a controller for receiving from an embedded controller of the another electronic apparatus a first message indicating a connection with the another electronic apparatus;
receiving from the another electronic apparatus an application and a second command indicating installment of the application, wherein attribute of the application is set installable in a system interface with respect to the another/first electronic apparatus;
after receiving the second command and the application, installing the application and transmitting to the another/first electronic apparatus a second message including information for generating an identifier of the application;
wherein after receiving the second message, the another first electronic apparatus generates on the display screen of the second electronic apparatus an identifier of the application, and sets attribute of the identifier of the application to be executable and uninstallable.

* * * * *